United States Patent
Zhang et al.

(10) Patent No.: US 12,432,749 B2
(45) Date of Patent: Sep. 30, 2025

(54) METHOD FOR PROCESSING DELAY FOR PDCCH REPETITIONS

(71) Applicant: Apple Inc., Cupertino, CA (US)

(72) Inventors: Yushu Zhang, Cupertino, CA (US); Chunxuan Ye, Beijing (CN); Dawei Zhang, Cupertino, CA (US); Haitong Sun, Cupertino, CA (US); Hong He, Cupertino, CA (US); Huaning Niu, Cupertino, CA (US); Sigen Ye, Cupertino, CA (US); Wei Zeng, Cupertino, CA (US); Weidong Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,158

(22) PCT Filed: Aug. 5, 2021

(86) PCT No.: PCT/CN2021/110839
§ 371 (c)(1),
(2) Date: Sep. 24, 2021

(87) PCT Pub. No.: WO2023/010406
PCT Pub. Date: Feb. 9, 2023

(65) Prior Publication Data
US 2024/0430904 A1 Dec. 26, 2024

(51) Int. Cl.
*H04W 72/231* (2023.01)
*H04L 5/00* (2006.01)
(Continued)

(52) U.S. Cl.
CPC ......... *H04W 72/231* (2023.01); *H04L 5/0053* (2013.01); *H04W 72/1273* (2013.01); *H04W 72/51* (2023.01); *H04W 72/566* (2023.01)

(58) Field of Classification Search
CPC . H04W 72/231; H04W 72/51; H04W 72/566; H04W 72/1273; H04W 8/22;
(Continued)

(56) References Cited

U.S. PATENT DOCUMENTS

2018/0270799 A1   9/2018   Noh et al.
2019/0089489 A1*  3/2019   Li ........................... H04L 1/189
(Continued)

FOREIGN PATENT DOCUMENTS

CN   112805948 A   5/2021
CN   113169841 A   7/2021
(Continued)

OTHER PUBLICATIONS

"Alignment of RRC parameter name for 38.214" Nokia Shanghai Bell. Nov. 13, 2020 (Year: 2020).*
(Continued)

*Primary Examiner* — Mewale A Ambaye
(74) *Attorney, Agent, or Firm* — Kubota & Basol LLP

(57) ABSTRACT

Disclosed are methods and apparatus to process delay for PDCCH repetition. A transmission of a physical downlink control channel (PDCCH) repetition may be monitored. A multiplexing pattern of the PDCCH repetition and a physical downlink shared channel (PDSCH) within an overlapping symbol may be determined. A processing delay for a decoding of the PDCCH repetition, a decoding of the scheduled PDSCH, and an acknowledgement (ACK) preparation based on the multiplexing pattern of the PDCCH repetition and the PDSCH within the overlapping symbol may be determined. The PDSCH may be monitored after receiving the PDCCH repetition.

20 Claims, 26 Drawing Sheets

(51) Int. Cl.
*H04W 72/1273* (2023.01)
*H04W 72/51* (2023.01)
*H04W 72/566* (2023.01)

(58) Field of Classification Search
CPC ..... H04L 5/0053; H04L 1/0038; H04L 1/108; H04L 1/16; H04L 1/08; H04L 1/1854; H04L 1/189
See application file for complete search history.

(56) References Cited

U.S. PATENT DOCUMENTS

| | | | |
|---|---|---|---|
| 2019/0222400 A1* | 7/2019 | Bagheri | ................... H04L 1/08 |
| 2020/0008235 A1* | 1/2020 | Sarkis | ................... H04W 72/21 |
| 2020/0022139 A1 | 1/2020 | Zhou et al. | |
| 2020/0112414 A1 | 4/2020 | Khoshnevisan et al. | |
| 2022/0038207 A1 | 2/2022 | Frenne et al. | |
| 2023/0091216 A1* | 3/2023 | Yamamoto | ................ H04L 1/08 370/329 |
| 2023/0371029 A1* | 11/2023 | Yamamoto | ............. H04L 1/1861 |
| 2023/0412340 A1* | 12/2023 | Maki | ..................... H04L 5/0023 |
| 2024/0373441 A1* | 11/2024 | Choi | ................... H04W 72/232 |

FOREIGN PATENT DOCUMENTS

| | | |
|---|---|---|
| WO | 2019/099738 A1 | 5/2019 |
| WO | 2020/006416 A1 | 1/2020 |

OTHER PUBLICATIONS

CN Office Action, Including Search report received for Chinese Patent Application No. 202180012255.8, mailed on Nov. 14, 2024, 16 pages (8 pages of English Translation and 8 pages of Original Document).

International Preliminary Report on Patentability received for PCT Patent Application No. PCT/CN2021/110839, mailed on Feb. 15, 2024, 5 pages.

International Search Report and Written Opinion received for PCT Patent Application No. PCT/CN2021/110839, mailed on Mar. 28, 2022, 6 pages.

Nokia, "Alignment of RRC parameter names for 38.214", 3GPP TSG-RAN WG1 Meeting #103-e, R1-2009778, Oct. 26-Nov. 13, 2020, 140 pages.

Nokia, "Corrections on NR URLLC support", 3GPP TSG-RAN WG1 Meeting #102-e, R1-2007472, e-Meeting, Aug. 17-28, 2020, 39 pages.

Vivo, Enhancements on Multi-TRP for PDCCH, PUCCH AND PUSCH, 3GPP TSG-RAN WG1 #104b-e, R1-2102507, Online, Apr. 12-20, 2021, 28 pages.

Moderator (Qualcomm), Summary #1 of email discussions [104b-e-NR-feMIMO-02] for mTRP PDCCH enhancements, 3GPP TSG-RAN WG1 Meeting #104-bis-e, R1-2103819, Online, Apr. 12-20, 2021, 54 pages.

Qualcomm Incorporated, Enhancements on Multi-TRP for PDCCH, PUCCH AND PUSCH, 3GPP TSG-RAN WG1 Meeting #104-bis-e, R1-2103151, Online, Apr. 12-20, 2021, 33 pages.

Huawei et al., Enhancements on multi-TRP for reliability and robustness in Rel-17, 3GPP TSG RAN WG1 Meeting #104bis-e, R1-2102334, Online, Apr. 12-20, 2021, 15 pages.

3GPP, 3rd Generation Partnership Project; Technical Specification Group Radio Access Network; NR; Physical layer procedures for data (Release 16), 3GPP TS 38.214 V16.6.0, Online, Jun. 2021, 172 pages.

MCC Support, Final Report of 3GPP TSG RAN WG1 #104bis-e v1.0.0, 3GPP TSG RAN WG1 Meeting #105-e, R1-2104151, Online, May 10-27, 2021, 141 pages.

Extended European Search Report received for European Patent Application No. 21952300.8, mailed on Jan. 7, 2025, 15 pages.

Guangdong OPPO Mobile Telecom, On resource sharing between PDCCH and PDSCH, 3GPP TSG RAN WG1 NR Ad-Hoc#2, R1-1710153, Qingdao, P.R. China Jun. 27-30, 2017, 6 pages.

* cited by examiner

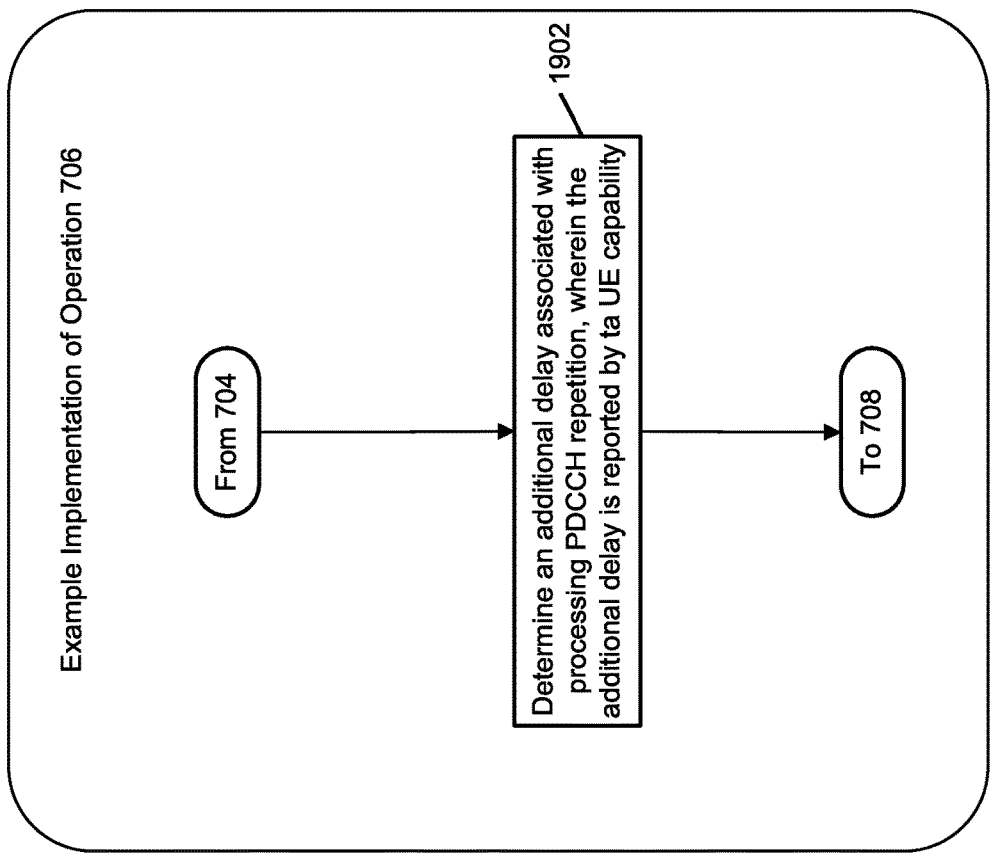

METHOD FOR PROCESSING DELAY FOR PDCCH REPETITIONS

RELATED APPLICATIONS

The present application is the national phase of International Application No. PCT/CN2021/110839, filed on Aug. 5, 2021 and the disclosure of which is hereby incorporated herein by reference in its entirety.

FIELD OF INVENTION

This invention relates generally to the field of wireless communication and to methods and apparatus for processing delay for physical downlink control channel (PDCCH) repetitions in wireless communication devices.

BACKGROUND OF THE INVENTION

In wireless communications networks, physical downlink control channel (PDCCH) is configured to carry control information such as a downlink control information (DCI) message indicating a downlink (DL) or an uplink (UL) resource for a scheduling resource allocation to a physical downlink shared channel (PDSCH) or a physical uplink shared channel (PUSCH). The PDCCH may carry the DCI that can provide a wireless user equipment (UE) with information for scheduling a channel at a scheduled slot. Successful decoding of the PDCCH may enable the UE to read the information carried on the DCI that can provide scheduling resource allocation for the PDSCH or the PUSCH.

The UE may receive the PDCCH carrying the DCI in a repetitive manner within a set of slots. The PDCCH may be configured to repeat in adjacent or non-adjacent slots per monitoring occasion of a corresponding search space (SS). The repetitive PDCCH that is received by the UE may be utilized for scheduling a channel for a reception or a transmission by the UE. Based on the received DCI within the repetitive PDCCH, the UE may communicate the channel such as the PDSCH or the PUSCH at the scheduled slot index.

SUMMARY OF THE DESCRIPTION

The repetitive PDCCH may be configured according to various repetition schemes. As the UE may receive the PDCCH in a repetitive manner, multiple transmit receive points (TRPs) may schedule PDSCHs from multiple TRPs (multi-TRP). Different or same data from multi-TRP may be transmitted for multiplexing for data rate enhancement or transmission reliability, respectively.

As PDCCH repetition is introduced to support low-latency and higher reliability communication, determining a processing delay may need to consider the PDCCH decoding latency. For example, there may a combination of a number of PDCCH repetition and a scheduled PDSCH within overlapping symbols. With respect to PDCCH repetitions, compared to Rel-15/Rel-16, the UE may need to decode more than one PDCCH to identify the PDSCH resources and prepare HARQ-ACK. Thus, some relaxation of delay requirement may be needed. However, currently, there is a lack on how to determine the process delay for repetitive PDCCH, particularly, to determine a number of overlapping symbols when there is an overlapping PDCCH repetition and a scheduled PDSCH. Thus, there is a need for an enhanced mechanism to determine the process delay for repetitive PDCCH in wireless communication devices to improve reliability and robustness for PDCCH decoding.

Methods and systems for processing delay for PDCCH repetition are disclosed. In one aspect, embodiments of the present disclosure provide a baseband processor of a wireless equipment (UE) configured to perform operations. The operations may include monitoring a transmission of a physical downlink control channel (PDCCH) repetition, determining a multiplexing pattern of the PDCCH repetition and a physical downlink shared channel (PDSCH) within an overlapping symbol, determining a processing delay for a decoding of the PDCCH repetition, a decoding of a scheduled PDSCH, and an acknowledgement (ACK) preparation based on the multiplexing pattern of the PDCCH repetition and the PDSCH within the overlapping symbol, and monitoring the PDSCH after receiving the PDCCH repetition.

In some embodiments, the multiplexing pattern of the PDCCH repetition and the PDSCH within the overlapping symbol may include one PDCCH repetition and the PDSCH.

In some embodiments, the operations of determining the processing delay based on the multiplexing pattern may further include selecting the PDCCH repetition that starts later in time compared to other PDCCH repetitions in a group of PDCCH repetitions, and determining a number of symbols associated with the one PDCCH repetition that overlaps with the PDSCH.

In one disclosed embodiment, the operations of determining the processing delay based on the multiplexing pattern may further include selecting the PDCCH repetition that starts earlier in time compared to other PDCCH repetitions in a group of PDCCH repetitions; and determining a number of symbols associated with the one PDCCH repetition that overlaps with the PDSCH.

In one disclosed embodiment, the operations of determining the processing delay based on the multiplexing pattern may further include selecting the PDCCH repetition that ends later in time compared to other PDCCH repetitions in a group of PDCCH repetitions, and determining a number of symbols associated with the one PDCCH repetition.

In one disclosed embodiment, the operations of determining the processing delay based on the multiplexing pattern may further include selecting the PDCCH repetition that ends earlier in time compared to other PDCCH repetitions in a group of PDCCH repetitions, and determining a number of symbols associated with the one PDCCH repetition that overlaps with the PDSCH.

In some embodiments, the multiplexing pattern of the PDCCH repetition and the PDSCH within the overlapping symbol may include two PDCCH repetitions and the PDSCH.

In some embodiments, the operations of determining the processing delay based on the multiplexing pattern may further include: determining a number of symbols associated with the two PDCCH repetitions as one symbol.

In an embodiment, the operations of determining the processing delay based on the multiplexing pattern may further include determining a number of symbols associated with the two PDCCH repetitions that overlap with the PDSCH as two symbols.

In an embodiment, the operations of determining the processing delay based on the multiplexing pattern may further include determining a number of symbols associated with the two PDCCH repetitions that overlap with the PDSCH based on a UE capability.

In some embodiments, the operations of determining the processing delay may be based on control resource set (CORESET) symbols when a number of symbols for the PDSCH is smaller than a number of symbols for the CORESET associated with a linked search space (SS). The CORESET symbols may include two PDCCH repetitions.

In some embodiments, the operations of determining the processing delay based on the multiplexing pattern may further include determining a number of symbols associated with the two PDCCH repetitions that overlap with the PDSCH as one symbol.

In some embodiments, the operations of determining the processing delay based on the multiplexing pattern may further include: determining a number of symbols associated with the two PDCCH repetitions that overlap with the PDSCH as two symbols.

In some embodiments, determining a number of the symbols associated with the two PDCCH repetitions that overlap with the PDSCH may be based on a UE capability.

In some embodiments, the operations of determining the processing delay may be based on CORESET symbols when a number of symbols for the PDSCH is smaller than a number of symbols for the CORESET associated with a linked SS. The CORESET symbols may include one PDCCH repetition.

In some embodiments, the operations of determining the processing delay based on the multiplexing pattern may further include: selecting the PDCCH repetition that starts later in time compared to other PDCCH repetitions in a group of PDCCH repetitions.

In some embodiments, the operations of determining the processing delay based on the multiplexing pattern may further include: selecting the PDCCH repetition that starts earlier in time compared to other PDCCH repetitions in a group of PDCCH repetitions.

In some embodiments, the operations of determining the processing delay based on the multiplexing pattern may further include: monitoring a second SS if a first SS of a linked SS is dropped.

In some embodiments, the UE may be configured to monitor the second SS via radio resource control (RRC) signaling.

In some embodiments, the operations of monitoring the second SS if the first SS of the linked SS is dropped may further include: decoding downlink control information (DCI) in the second SS based on a single transmission/reception point (TRP) operation.

In some embodiments, the operations of monitoring the second SS if the first SS of the linked SS is dropped may further include: decoding DCI in the second SS based on a multi-TRP operation.

In some embodiments, the operations of monitoring the second SS if the first SS of the linked SS is dropped may further include: reporting a UE capability to indicate a DCI is decoded based on a single TRP operation or a multi-TRP operation.

In some embodiments, the operations of monitoring the second SS if the first SS of the linked SS is dropped may further include: determining that one PDCCH candidate of an independent SS shares a same configuration as a first PDCCH candidate for the PDCCH repetition; and determining that the one PDCCH candidate belongs to the independent SS or the linked SS.

In some embodiments, the operations of determining that the one PDCCH candidate belongs to the independent SS or the linked SS may further include: determining a priority score for the one PDCCH candidate based on a predefined priority rule.

In some embodiments, the priority score for the one PDCCH candidate may indicate that the one PDCCH candidate belongs to the independent SS is prioritized. The operations may further include: monitoring a second PDCCH candidate by the UE capability.

In some embodiments, the operations of determining a processing delay based on the multiplexing pattern may further include: determining an additional delay associated with processing PDCCH repetition. The additional delay may be reported by a UE capability.

In some embodiments, the additional delay may be determined by the UE capability to perform a blind detection (BD) counting for two PDCCH repetitions.

In some embodiments, the additional delay may be predefined based on a predefined PDCCH repetition detection scheme.

In another aspect of the disclosure, embodiments of the present disclosure also provide a UE including at least one antenna, at least one radio, and at least one processor configured to perform the processes as described above.

BRIEF DESCRIPTION OF THE DRAWINGS

The present invention is illustrated by way of example and not limitation in the figures of the accompanying drawings in which like references indicate similar elements.

FIG. 19 depicts a flow diagram of a method by a UE for processing delay for PDCCH repetition in wireless communication devices according to one aspect of the disclosure.

DETAILED DESCRIPTION

Figure 1:
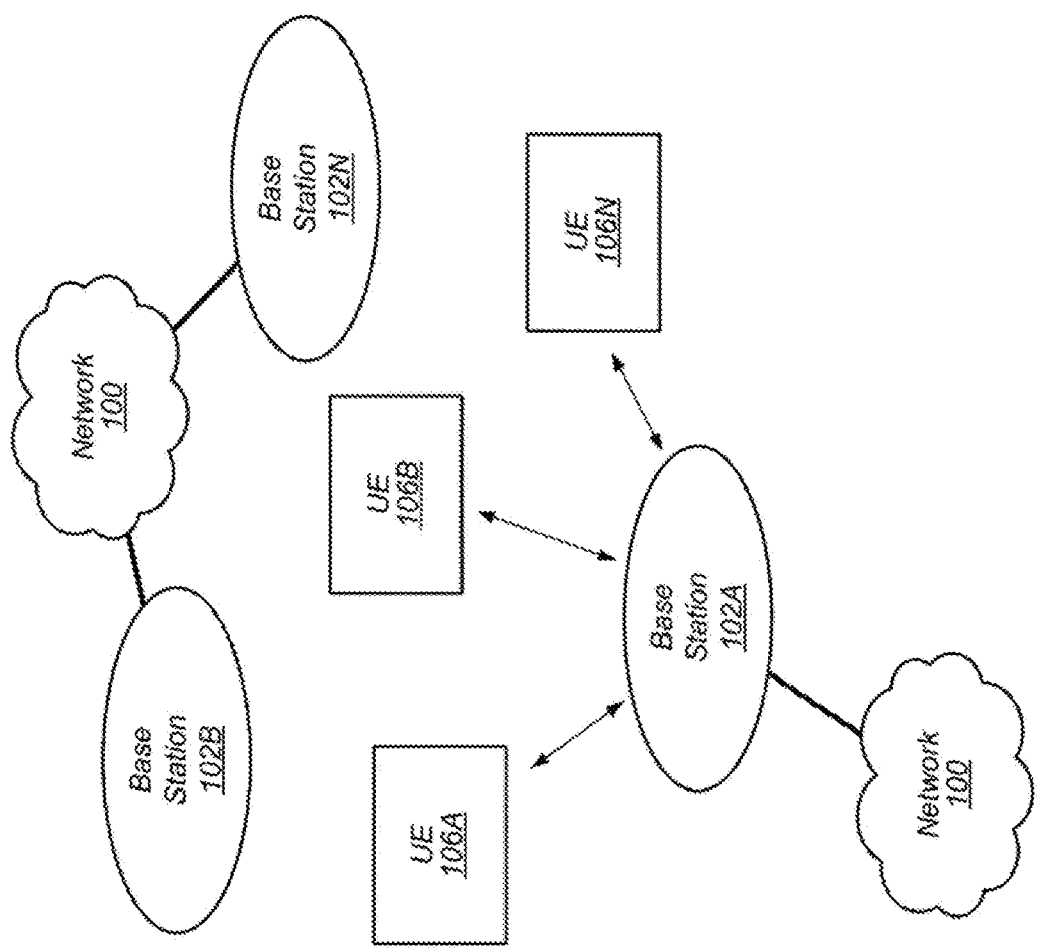
FIG. 1 illustrates an example wireless communication system according to one aspect of the disclosure.

Methods and apparatus for processing delay for physical downlink control channel (PDCCH) repetition are disclosed. The operations may include monitoring a transmission of a PDCCH repetition, determining a multiplexing pattern of the PDCCH repetition and a physical downlink shared channel (PDSCH) within an overlapping symbol, determining a processing delay for a decoding of the PDCCH repetition based on the multiplexing pattern of the PDCCH repetition and the PDSCH within the overlapping symbol, and scheduling a downlink (DL) reception via the PDSCH.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

In Rel-15 and Rel-16, a PDCCH can be carried in a search space (SS) associated with a control resource set (CORE-SET) [10.1, 38.213]. The SS can be used to determine a time domain resource. The CORESET can be used to determine a frequency domain resource and a spatial filter, i.e. transmission configuration indicator (TCI). SS/CORESET #0 is a special SS/CORESET, in which each instance is associated with a Synchronization Signal Block (SSB). PDCCH beam, time/frequency location may be determined by the associated SSB. A wireless user equipment (UE) may not need to monitor all instances for SS/CORESET 0, instead, the UE may only need to monitor the SS/CORESET 0 instance associated with one SSB from the most recent of the following: (1) SSB associated with a Random Access Channel (RACH) procedure, (2) SSB Quasi Colacated (QCLed) with the Channel State Information-Reference Signal (CSI-RS) in the TCI State for the CORESET 0.

In Rel-17, two PDCCH reliability enhancement schemes may be supported. Firstly, a single frequency network (SFN) scheme may be used in which one CORESET can be configured with two TCI states. PDCCH from different Transmission Reception Points (TRPs) can be transmitted in fully overlapped resource elements with different beams. The UE may be required to perform a TRP-specific time/frequency offset tracking and a time/frequency offset combining to decode the PDCCH.

Secondly, in a non-SFN scheme, two SSs/CORESETs can be used to carry PDCCH repetitions. Each PDCCH repetition is carried by a SS/CORESET. Different beams can be applied to different SS/CORESETs. PDCCH repetitions may be multiplexed in a time domain multiplexing (TDM)/frequency domain multiplexing (FDM) manner.

There can be two detection schemes to detect PDCCH repetition and these two detection schemes may require different decoding latency. Scheme 1 may be a selective decoding. The UE detects each repetition independently, and the PDCCH can be considered as "detected" if one of the PDCCH is decoded successfully.

Scheme 2 may be a soft combining. The UE combines the soft-bits for each repetition and uses the combined soft-bits for channel decoding to jointly decode the PDCCH repetitions.

In Rel-15, PDSCH processing delay is calculated by Tproc,1, as shown below. Tproc, 1 may indicate the minimal delay between the last PDSCH symbol to the first symbol for Hybrid automatic repeat request-acknowledgement (HARQ-ACK) report [5.3, 38.214].

$$T_{proc,1} = (N_1 + d_{1,1} + d_2)(2048 + 144) \cdot \kappa 2^{-\mu} \cdot T_c + T_{ext}$$

wherein $N_1$ depends on UE capability, which defines the general processing delay for PDSCH; $d_{1,1}$ indicates additional delay based on the PDSCH and PDCCH resource mapping pattern; $d_2$ indicates additional delay for UCI multiplexing for HARQ-ACK report.

Additional delay based on the PDSCH and PDCCH resource mapping pattern $d_{1,1}$ may be calculated as follows in Rel-16 [5.3, 38.214]. With regard to different PDCCH repetitions schemes, the calculation of $d_{1,1}$ needs to be enhanced. PDSCH and PDCCH may be multiplexed in overlapping or non-overlapping symbols. d1,1 can be used to determine different multiplexing patterns that require different processing delays. Thus, the enhancement of the calculation of d1,1 can provide insight to the UE processing timeline.

Below are some of the examples of a calculation for the additional delay based on the PDSCH and PDCCH resource mapping pattern.

For UE processing capability 1: If the PDSCH is mapping type B as given in clause 7.4.1.1 of [4, TS 38.211], and
  if the number of PDSCH symbols allocated is L≥7, then $d_{1,1}=0$;
  if the number of PDSCH symbols allocated is L≥4 and L≤6, then $d_{1,1}=7-L$;
  if the number of PDSCH symbols allocated is L=3 then $d_{1,1}=3+\min(d, 1)$, where d is the number of overlapping symbols of the scheduling PDCCH and the scheduled PDSCH; and
  if the number of PDSCH symbols allocated is 2, then $d_{1,1}=3+d$, where d is the number of overlapping symbols of the scheduling PDCCH and the scheduled PDSCH.

For UE processing capability 2: If the PDSCH is mapping type B as given in clause 7.4.1.1 of [4, TS 38.211], and
  if the number of PDSCH symbols allocated is L≥7, then $d_{1,1}=0$;
  if the number of PDSCH symbols allocated is L≥3 and L≤6, then $d_{1,1}$ is the number of overlapping symbols of the scheduling PDCCH and the scheduled PDSCH;
  if the number of PDSCH symbols allocated is 2;
  if the scheduling PDCCH was in a 3-symbol CORESET and the CORESET and the PDSCH had the same starting symbol, then $d_{1,1}=3$; and
  otherwise $d_{1,1}$ is the number of overlapping symbols of the scheduling PDCCH and the scheduled PDSCH.

The UE can report some processing delay threshold timeDurationForQCL, beamSwitchTiming, CSI processing delay Z and Z' [5.4, 38.214] and so on to indicate the processing delay for UE to decode PDCCH and to perform beam switching.

With regard to different PDCCH receiving schemes, the UE may require different processing delay for PDCCH decoding compared to Rel-15 PDCCH. In Rel-15, the UE needs to decode only one PDCCH to identify the PDSCH resources and prepare HARQ-ACK.

Similarly, additional delay needs to be considered for PUSCH preparation delay Tproc,2 [6.4, 38.214]

$$T_{proc,2} = \max((N_2 + d_{2,1} + d_2)(2048 + 144) \cdot \kappa 2^{-\mu} \cdot T_c + T_{ext} + T_{switch}, d_{2,2})$$

If the first SS of the linked SSs is dropped due to overbooking, QCL-TypeD collision etc., and the PDCCH from the second SS is decoded correctly, how to interpret whether the PDCCH is for single-TRP or multi-TRP may be considered.

If one PDCCH candidate from an independent SS shares the same configuration as the one PDCCH candidate for PDCCH repetitions, how to interpret whether the PDCCH is for single-TRP or multi-TRP may be considered.

For both cases above, the method for how to define the processing delay may be described herein. Note that in this present disclosure, the solution may be common or different for different PDCCH repetition schemes, i.e. SFN and non-SFN.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'. The base station 102A may alternately be referred to using other terms if implemented in the context of other RATs.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
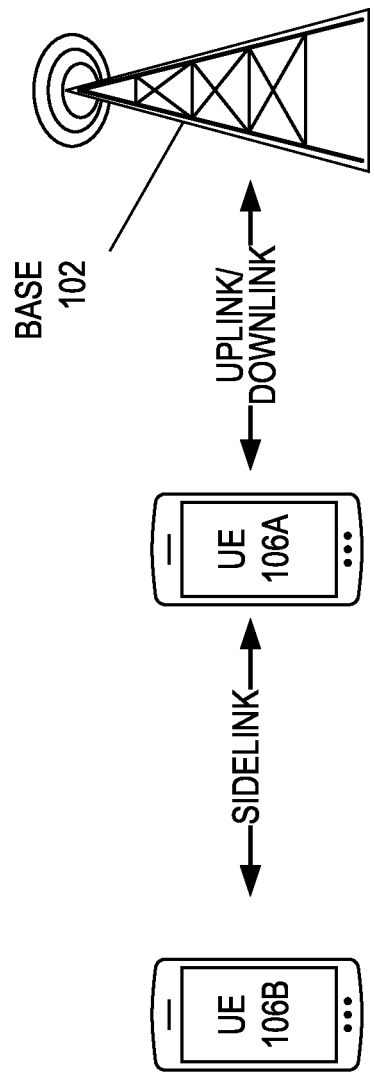
FIG. 2 illustrates user equipment 106A and 106B that can be in direct communication with each other (also known as device to device or sidelink) according to one aspect of the disclosure.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

UE 106A can also be in communication with a base station 102 through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTT or LTE or GSM), and separate radios for communicating using each of Wi-Fi and Bluetooth. Other configurations are also possible.

Figure 3:
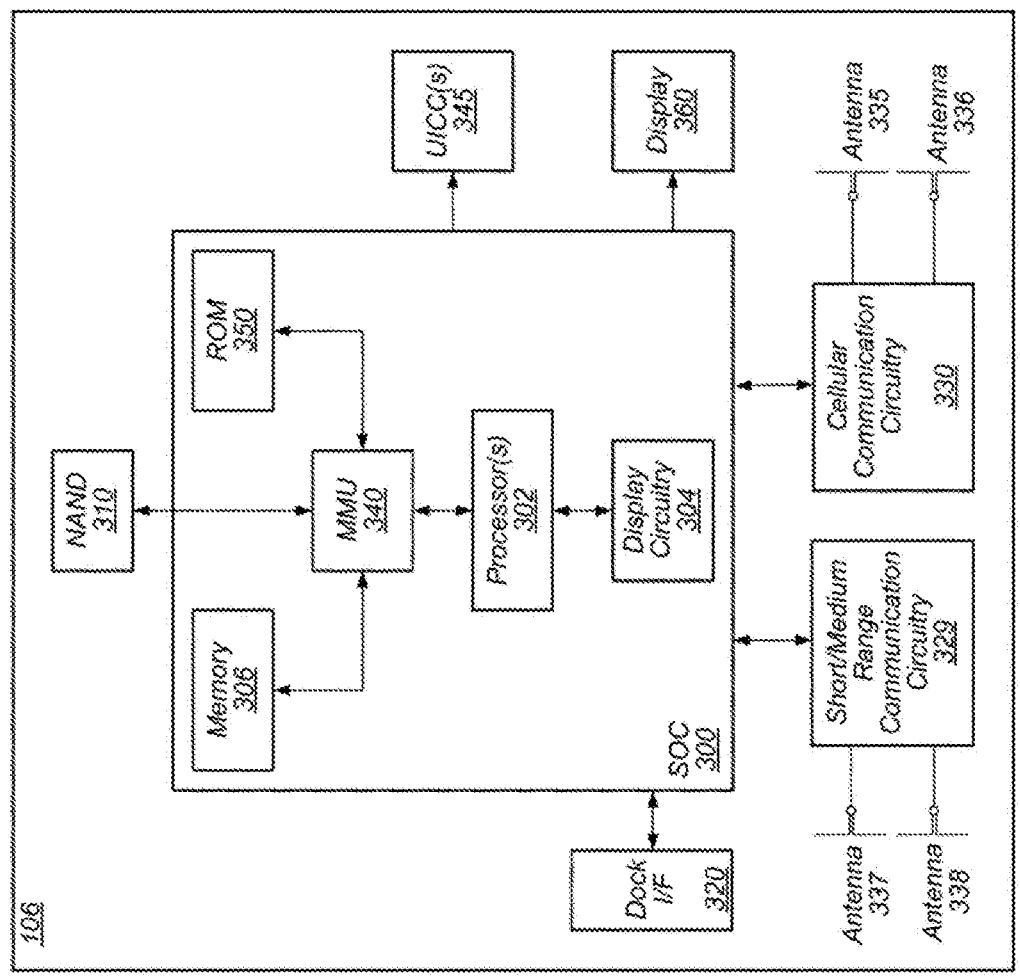
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly; dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
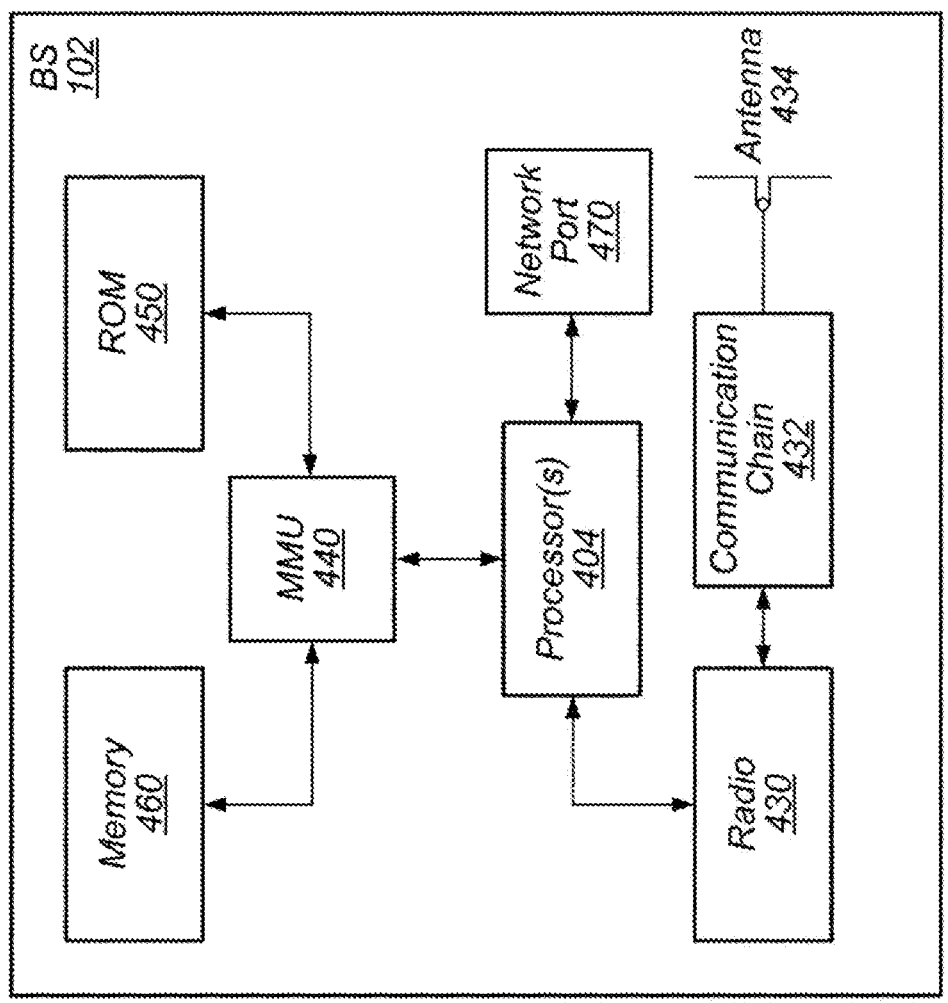
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC)

network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
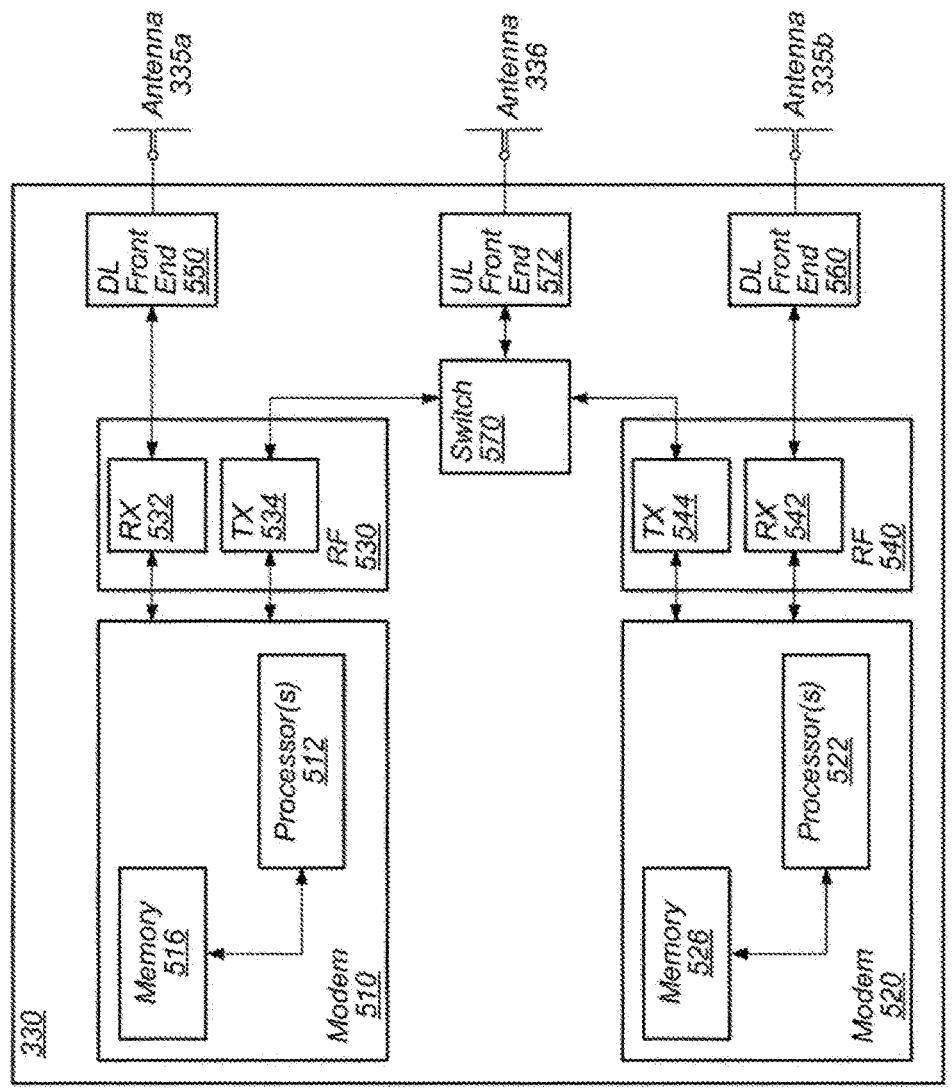
FIG. 5 illustrates an example block diagram of cellular communication circuitry according to one aspect of the disclosure.

FIG. 5 illustrates an example simplified block diagram of cellular communication circuitry 330 according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly; dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium), such as memory 516 and/or memory 526, for example. Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
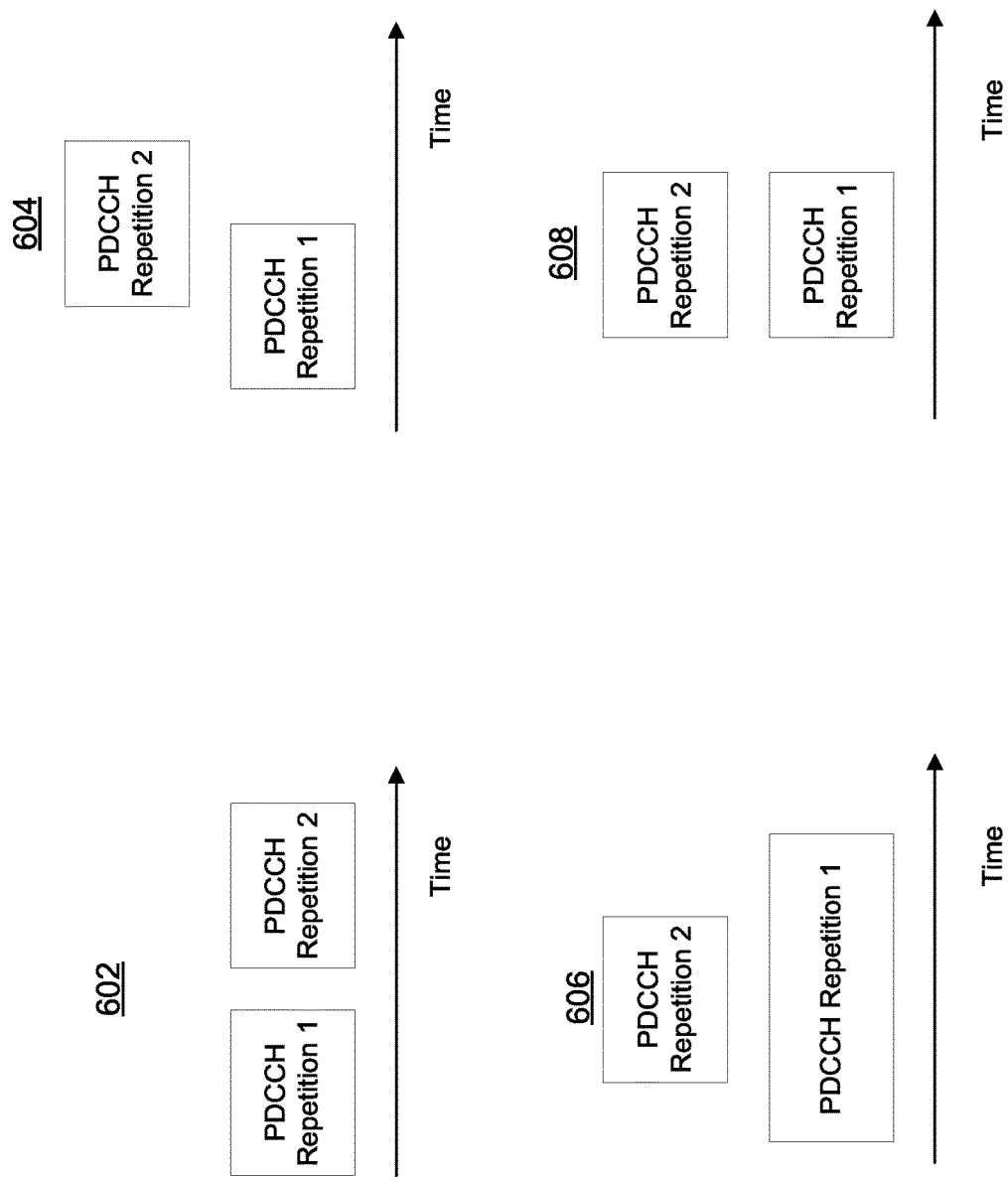
FIG. 6 illustrates an example of various configurations of two PDCCH repetitions for non-SFN according to one aspect of the disclosure.

FIG. 6 illustrates an example of various configurations of two PDCCH repetitions for non-SFN, according to some embodiments. Referring to FIG. 6, different multiplexing for two PDCCH repetitions are shown. The two PDCCH repetitions can be orthogonal 602, partially 604 or fully overlapped 606, 608 in time domain.

Figure 7:
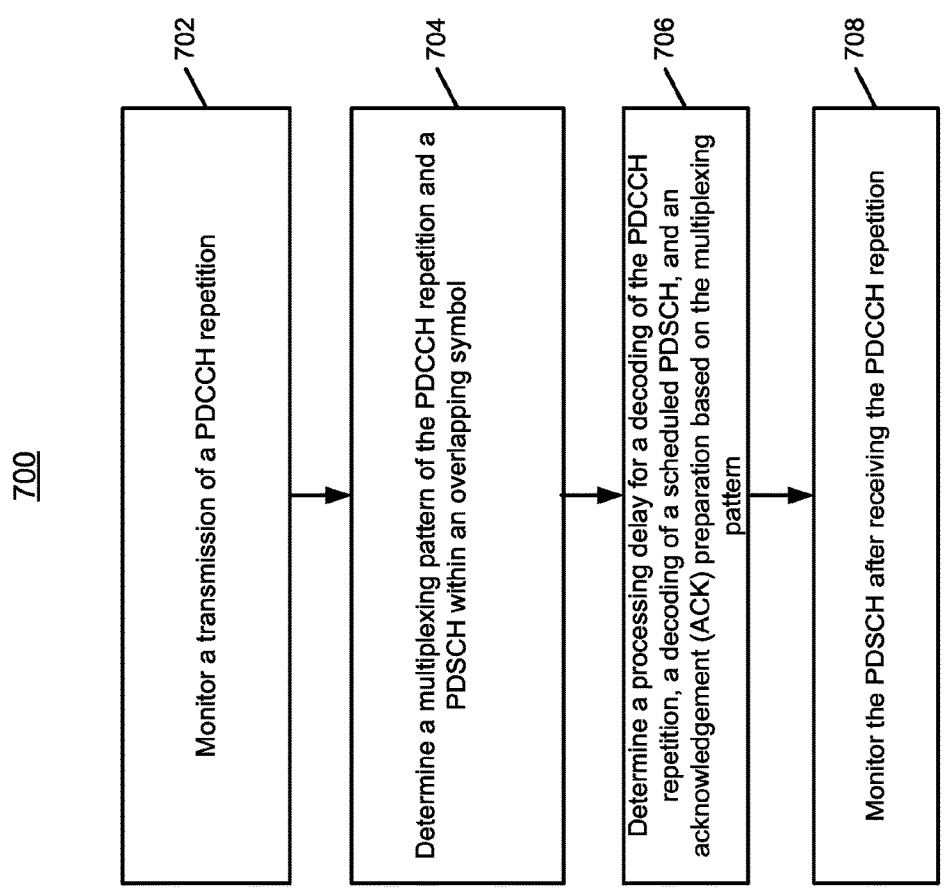
FIG. 7 depicts a flow diagram of a method by a UE for processing delay for PDCCH repetition in wireless communication devices according to one aspect of the disclosure.

FIG. 7 illustrates a flow diagram of a method 700 by the UE for processing delay for PDCCH repetitions in wireless communication devices, according to some embodiments. Process 700 may be performed by processing logic which may include software, hardware, or a combination thereof. Referring to FIG. 7, in operation 702, the UE may monitor a transmission of a physical downlink control channel (PDCCH) repetition.

In operation 704, the UE may determine a multiplexing pattern of the PDCCH repetition and a physical downlink shared channel (PDSCH) within an overlapping symbol.

In operation 706, the UE may determine a processing delay for a decoding of the PDCCH repetition, a decoding of a scheduled PDSCH, and an acknowledgement (ACK) preparation based on the multiplexing pattern of the PDCCH repetition and the PDSCH within the overlapping symbol.

In operation 708, the UE may monitor the PDSCH after receiving the PDCCH repetition.

FIGS. 8A-8F illustrate examples of implementation of the operation 706 of determining a processing delay based on the multiplexing pattern of the PDCCH repetition and the PDSCH within the overlapping symbol described above.

Figure 8A:
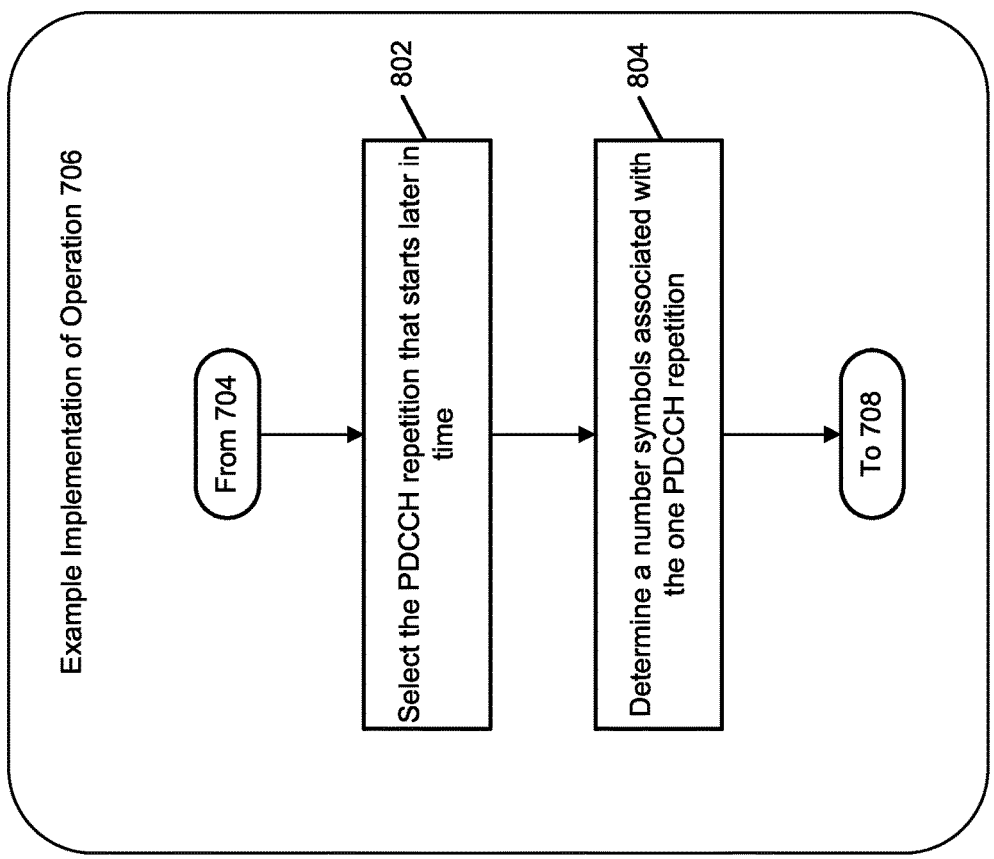
FIGS. 8A-8F depict a flow diagram of various methods by a UE for determining a processing delay for the decoding of the PDCCH repetition based on the multiplexing pattern according to one aspect of the disclosure.

Referring to FIG. 8A, in some embodiments, the multiplexing pattern of the PDCCH repetition and the PDSCH within the overlapping symbol may include one PDCCH repetition and the PDSCH. The operations of determining the processing delay based on the multiplexing pattern may further include the following operations. In operation 802, the UE may select the PDCCH repetition that starts later in time compared to other PDCCH repetitions in a group of PDCCH repetitions. In operation 804, the UE may determine a number of symbols associated with the one PDCCH repetition that overlaps with the PDSCH. FIG. 8E illustrates an example selecting the PDCCH repetition and determining a number of symbols associated with that one PDCCH repetition. As shown in FIG. 8E, for example, in counting the symbols within that one PDCCH repetition, the UE may select the PDCCH repetition that starts later in time 822 compared to other PDCCH repetitions in a group of PDCCH repetitions. After selecting the PDCCH repetition that starts later in time 822, the UE may determine a number of symbols associated with that one PDCCH repetition. In this case, the UE processing complexity can be relaxed because there may be less PDCCH symbol that overlaps with the PDSCH.

Figure 8B:
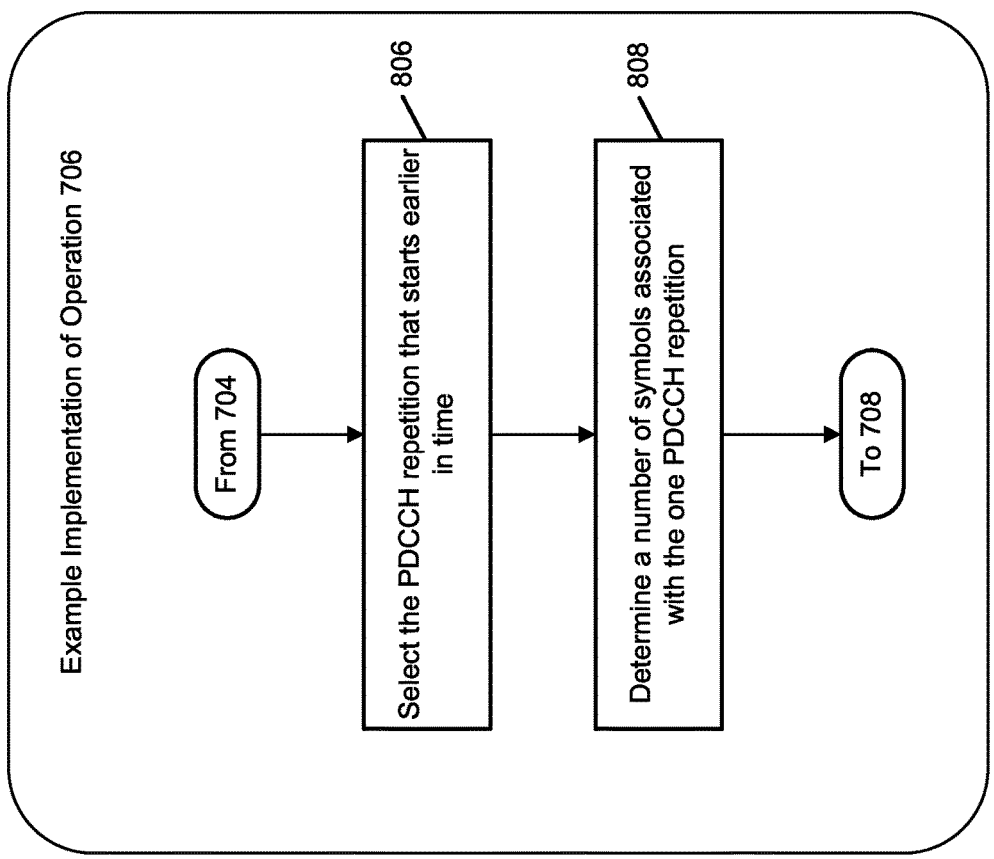

Referring to FIG. 8B, in some embodiments, the multiplexing pattern of the PDCCH repetition and the PDSCH within the overlapping symbol may include one PDCCH repetition and the PDSCH. The operation of determining the processing delay based on the multiplexing pattern may further include the following operations. In operation 806, the UE may select the PDCCH repetition that starts earlier in time compared to other PDCCH repetitions in a group of PDCCH repetitions. In operation 808, the UE may determine a number of symbols associated with the one PDCCH repetition. As shown in FIG. 8E, for example, in counting the symbols within that one PDCCH repetition, the UE may select the PDCCH repetition that starts earlier in time 820 compared to other PDCCH repetitions in a group of PDCCH repetitions. After selecting the PDCCH repetition that starts earlier in time 820, the UE may determine a number of symbols associated with that one PDCCH repetition. When the UE selects the PDCCH repetition that starts earlier in time compared to other PDCCH repetitions in a group of PDCCH repetitions, a PDSCH can be transmitted earlier, thereby reducing the latency.

Figure 8C:
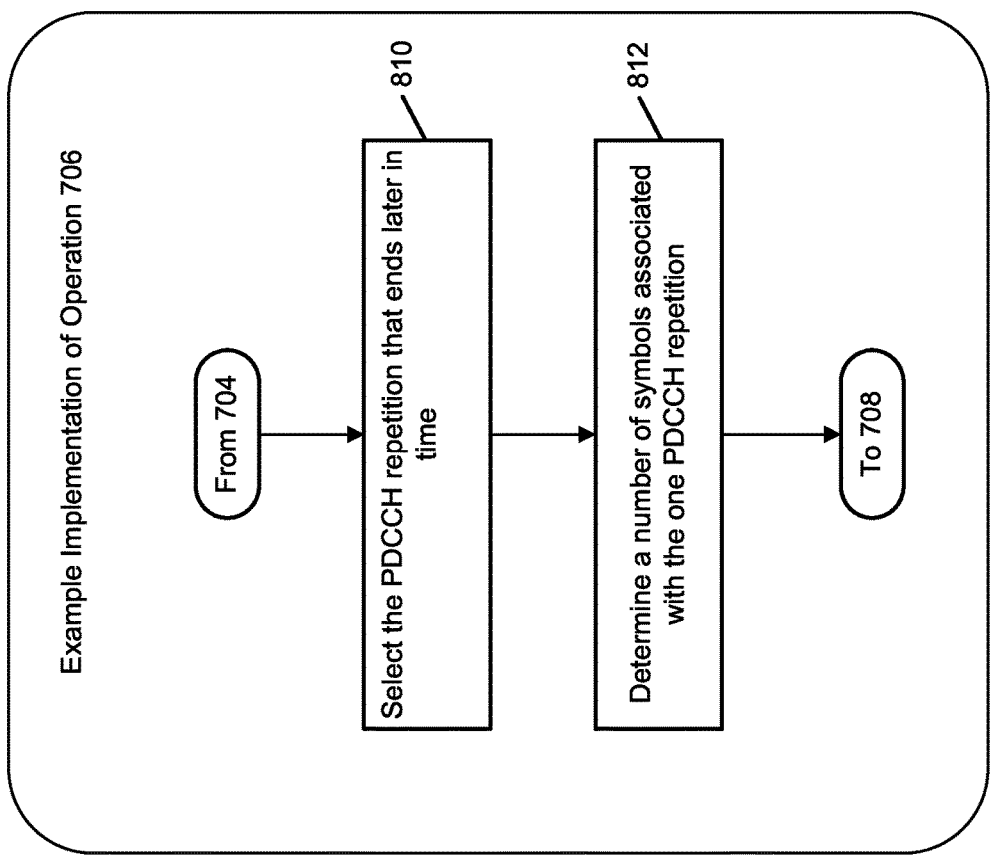

Referring to FIG. 8C, in some embodiments, the multiplexing pattern of the PDCCH repetition and the PDSCH within the overlapping symbol may include one PDCCH repetition and the PDSCH. The operations of determining the processing delay may further include the following operations. In operation 810, the UE may select the PDCCH repetition that ends later in time compared to other PDCCH repetitions in a group of PDCCH repetitions. In operation 812, the UE may determine a number of symbols associated with the one PDCCH repetition that overlaps with the PDSCH. As shown in FIG. 8F, for example, in counting the symbols within that one repetition, the UE may select the PDCCH repetition that ends later in time 826 compared to other PDCCH repetitions in a group of PDCCH repetitions. After selecting the PDCCH repetition that ends later in time

826, the UE may determine a number of symbols associated with that one PDCCH repetition. In this case, the UE processing complexity can be relaxed because there may be less PDCCH symbol overlaps with the PDSCH.

Figure 8D:
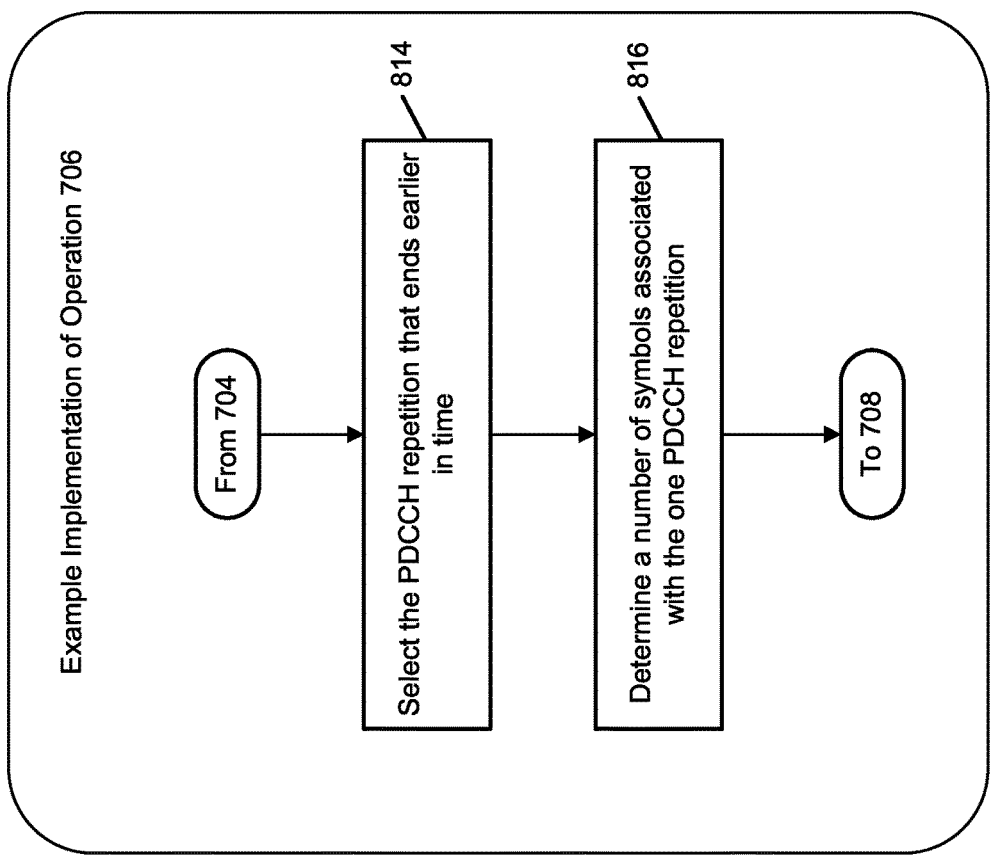
Figure 8E:
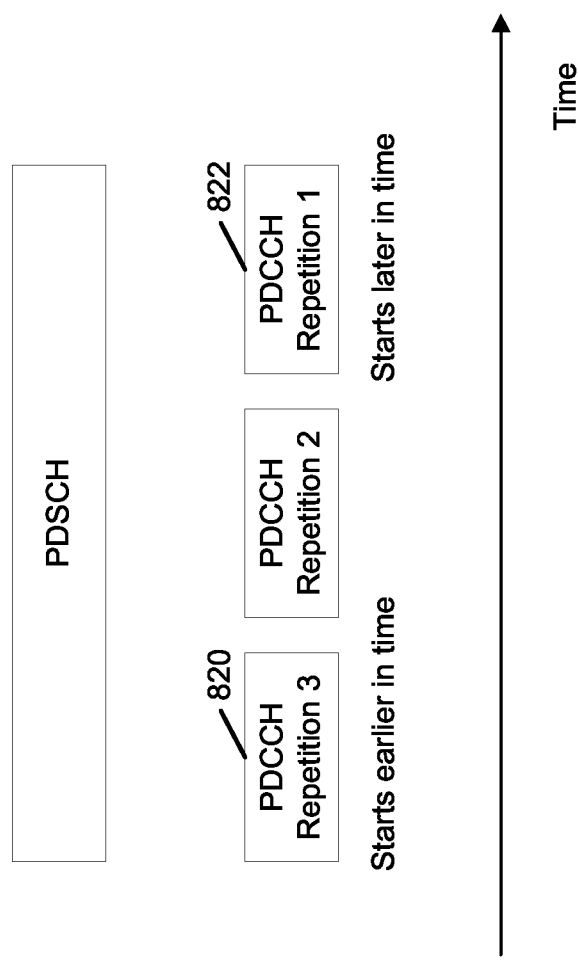
Figure 8F:
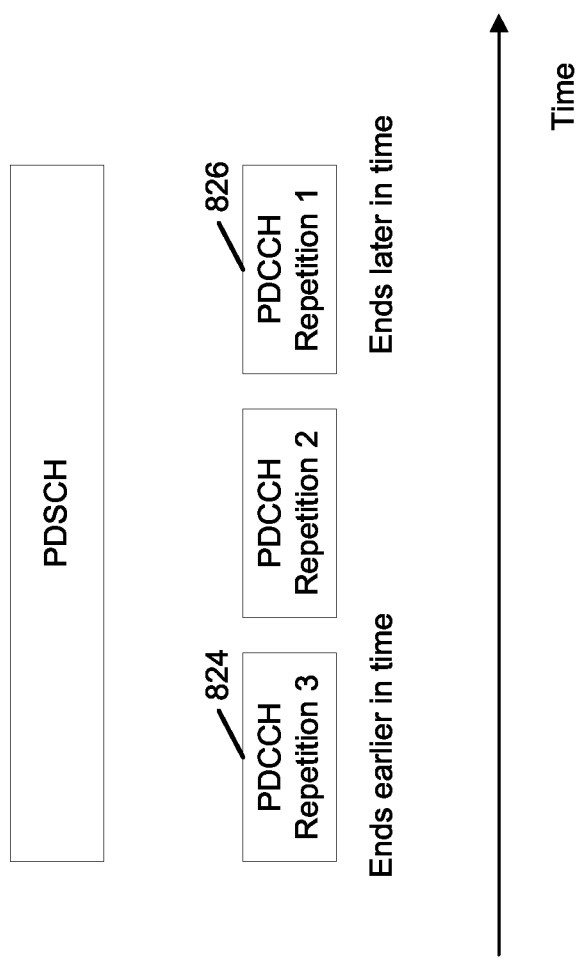

Referring to FIG. 8D, in some embodiments, the multiplexing pattern of the PDCCH repetition and the PDSCH within the overlapping symbol may include one PDCCH repetition and the PDSCH. The operations of determining the processing delay based on the multiplexing pattern may further include the following operations. In operation 814, the UE may select the PDCCH repetition that ends earlier in time compared to other PDCCH repetitions in a group of PDCCH repetitions. In operation 816, the UE may determine a number of symbols associated with the one PDCCH repetition. As shown in FIG. 8F, for example, in counting the symbols within that one repetition, the UE may select the PDCCH repetition that ends earlier in time 824 compared to other PDCCH repetitions in a group of PDCCH repetitions. After selecting the PDCCH repetition that ends earlier in time 824, the UE may determine a number of symbols associated with that one PDCCH repetition. When the UE selects the PDCCH repetition that ends earlier in time compared to other PDCCH repetitions in a group of PDCCH repetitions, a PDSCH can be transmitted earlier, thereby reducing the latency.

Figure 9A:
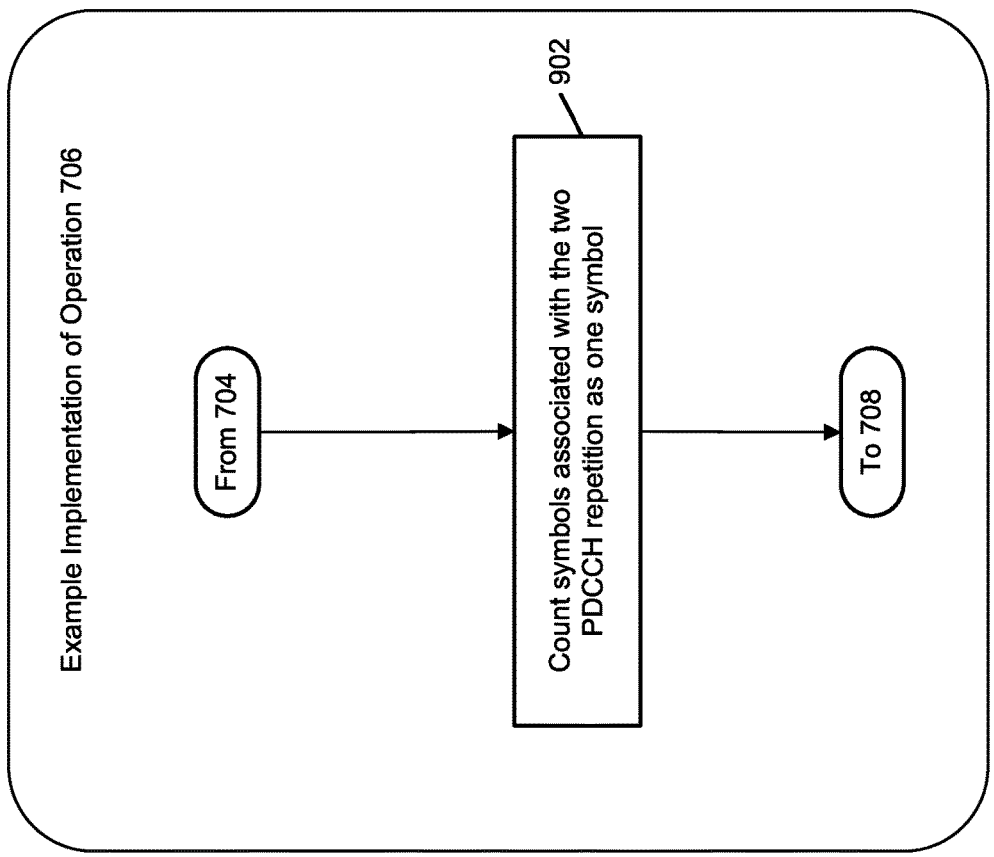
FIG. 9A depicts a flow diagram of a method by a UE for determining a processing delay for the decoding of the PDCCH repetition based on the multiplexing pattern according to one aspect of the disclosure.
Figure 9B:
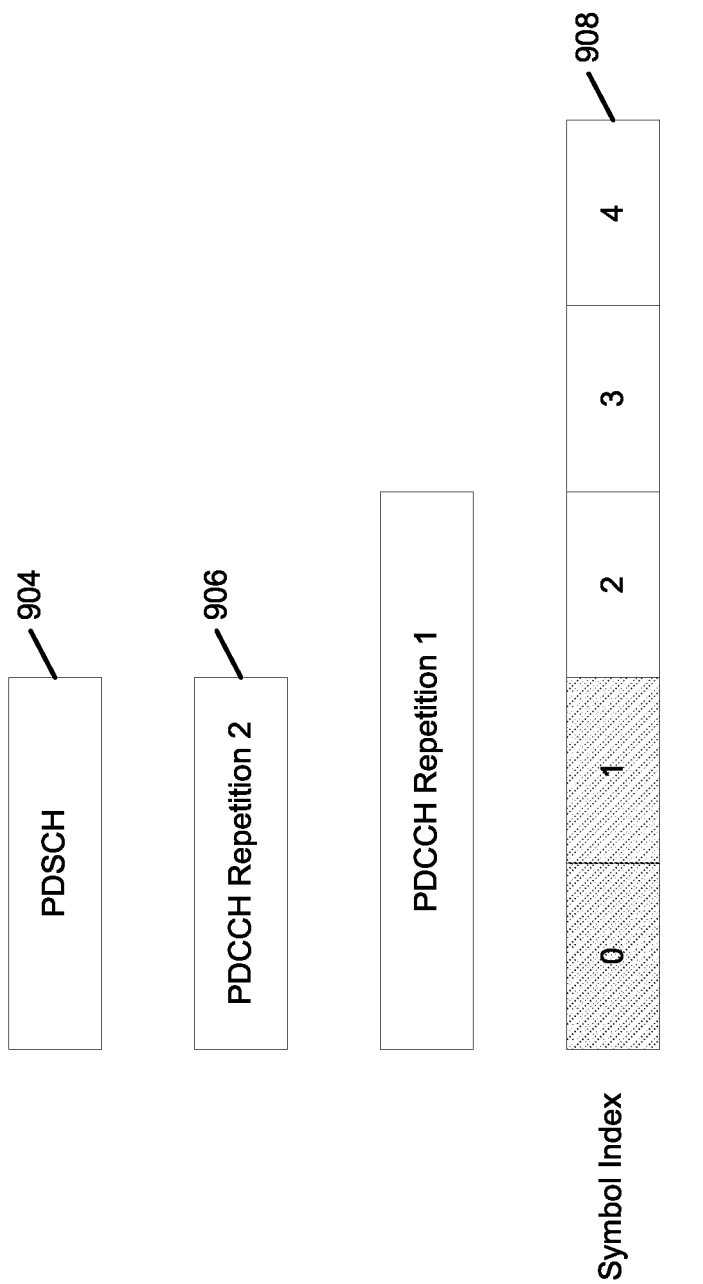
FIG. 9B depicts an example of symbol counting when a symbol contains 2 PDCCH repetitions and PDSCH according to one aspect of the disclosure.

In FIG. 9A, the multiplexing pattern of the PDCCH repetition and the PDSCH within the overlapping symbol may include two PDCCH repetitions and the PDSCH. Referring to FIG. 9B, the multiplexing pattern of the PDCCH repetition and the PDSCH may include two PDCCH repetitions 906 and a PDSCH 904. The operations of determining the processing delay based on the multiplexing pattern may further include the following operation. In operation 902, the UE may determine a number of symbols associated with the two PDCCH repetitions that overlap with the PDSCH as one symbol. For example, each of symbol 0 and symbol 1 is counted as one symbol (single counting). In this case, $d_{1,1}$ equals to mean and therefore the UE may have a low decoding latency but with a high processing complexity.

FIG. 9B illustrates an example of symbol counting when a symbol contains 2 PDCCH repetitions 906 and PDSCH 904, according to some embodiments. In one embodiment, the following options are provided to determine the number of overlapped symbols between scheduling PDCCH 906 and scheduled PDSCH 904 for the calculation of $d_{1,1}$. In FIG. 9B, the UE may count symbols 908 associated with the two PDCCH repetitions 906 as one symbol when calculating the additional delay based on the PDSCH 904 and PDCCH resource mapping pattern. That is, even though there are two PDCCH repetitions overlapping in slot indexes 0 and 1 in the depicted symbols 908, each instance where there is an overlap in a symbol is counted as one overlapped symbol for purposes of determining the processing delay for decoding of the PDCCH repetitions. In the illustrated example, the total number of overlapped symbols between scheduling PDCCH and scheduled PDSCH may be considered as 2 (symbols 0 and 1).

Figure 10A:
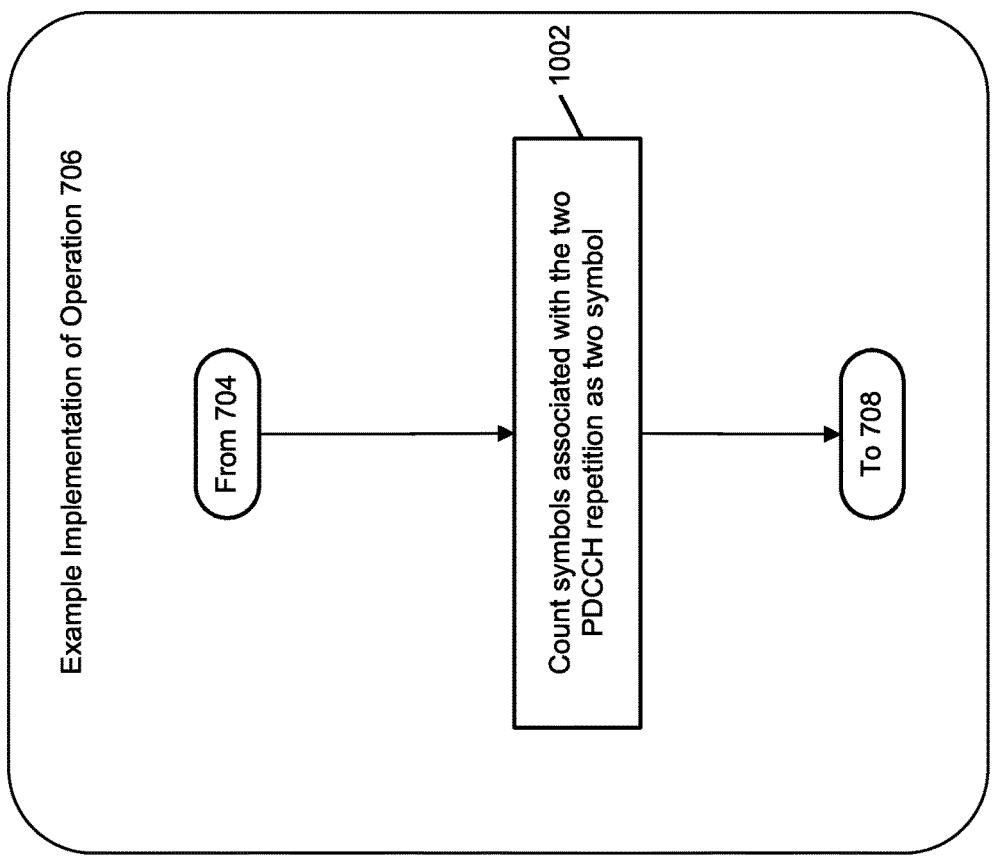
FIG. 10A depicts a flow diagram of a method by a UE for determining a processing delay for the decoding of the PDCCH repetition based on the multiplexing pattern according to one aspect of the disclosure.
Figure 10B:
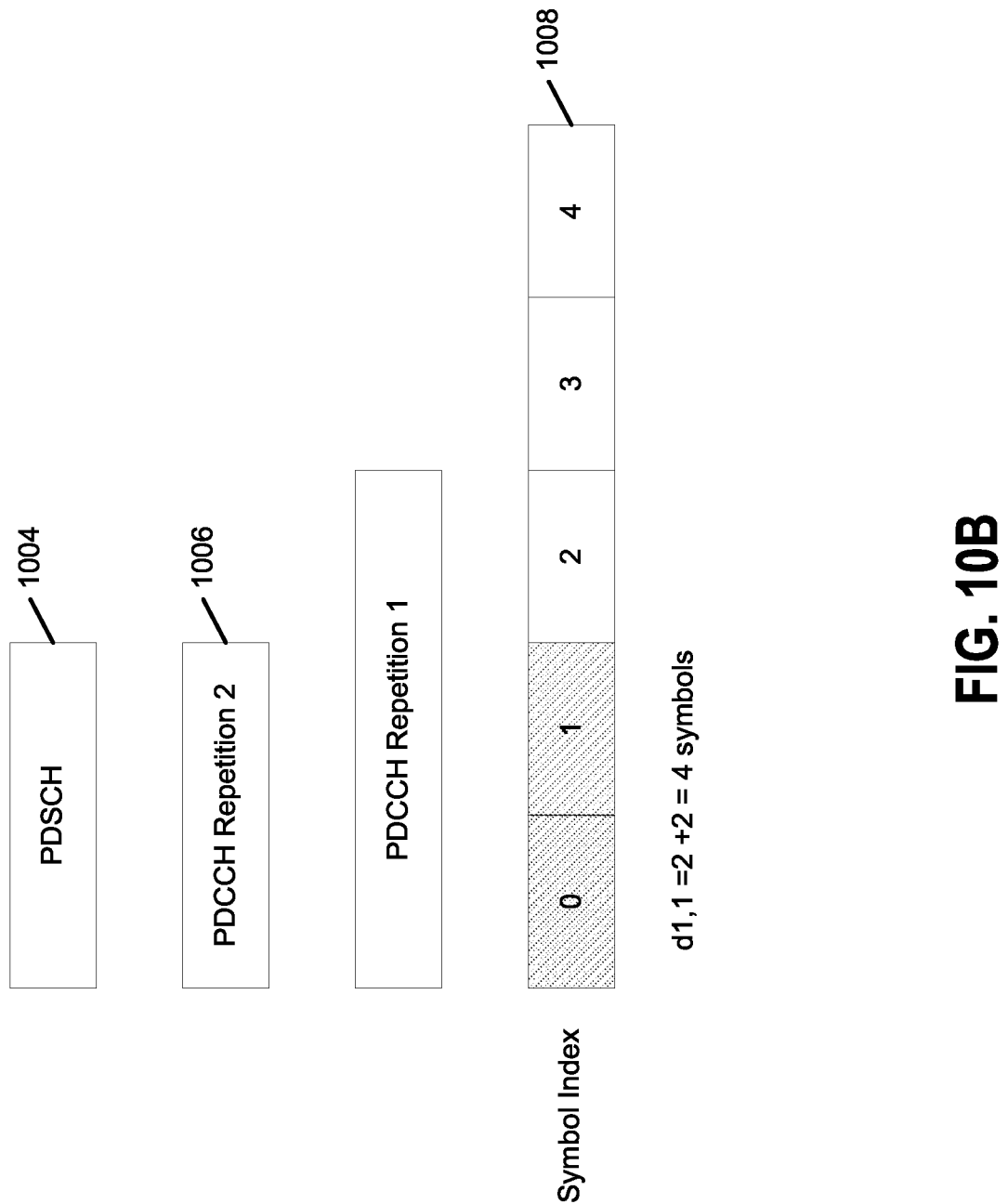
FIG. 10B depicts an example of symbol counting when a symbol contains 2 PDCCH repetitions and PDSCH, according to some embodiments.

In FIG. 10A, the multiplexing pattern of the PDCCH repetition and the PDSCH within the overlapping symbol may include two PDCCH repetitions and the PDSCH. The operations of determining the processing delay based on the multiplexing pattern may further include the following operation. In operation 1002, the UE may determine a number of symbols associated with the two PDCCH repetitions that overlap with the PDSCH as two symbols (double counting). In FIG. 10B, in view of the two PDCCH repetitions that overlap in symbol index 0 and 1, the UE may count symbols 1008 associated with the two PDCCH repetitions 1006 as two symbols in each symbol (symbols 0 and 1) when calculating the additional delay based on the PDSCH 1004 and PDCCH resource mapping pattern. That is, the total number of overlapped symbols between scheduling PDCCH and scheduled PDSCH 1004 may be considered as 4. The double counting may provide additional latency to the UE to decode the PDSCH but with low processing complexity.

Figure 11:
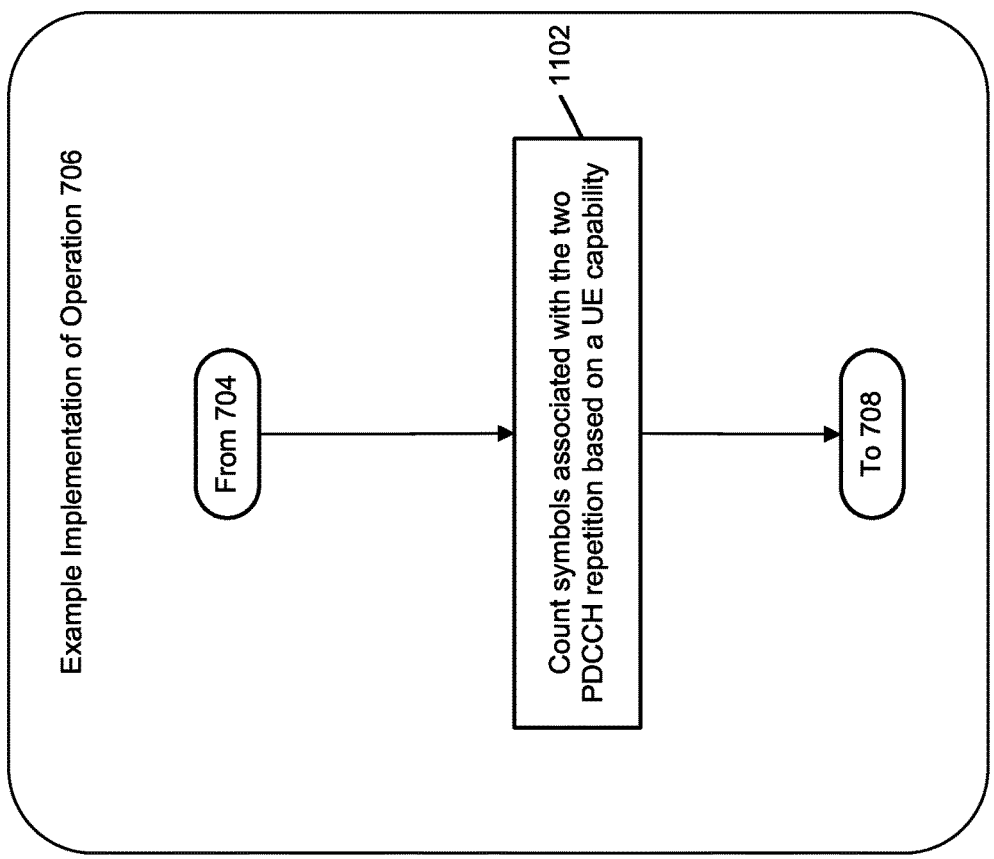
FIGS. 11-12 depict a flow diagram of a method by a UE for determining a processing delay for the decoding of the PDCCH repetition based on the multiplexing pattern according to one aspect of the disclosure.

In FIG. 11, the multiplexing pattern of the PDCCH repetition and the PDSCH within the overlapping symbol may include two PDCCH repetitions and the PDSCH. The operations of determining the processing delay based on the multiplexing pattern may further include the following operation. In operation 1102, the UE may determine a number of symbols associated with the two PDCCH repetitions that overlap with the PDSCH based on a UE capability.

In some embodiments, the operations of determining the processing delay may be based on control resource set (CORESET) symbols when a number of symbols for the PDSCH is smaller than a number of symbols for the CORESET associated with a linked search space (SS). The CORESET symbols may include two PDCCH repetitions.

For UE capability 2, if the number of symbols for scheduled PDSCH is smaller than the number of symbols for the CORESETs associated with the linked SSs starting from the PDSCH symbol, $d\_1,1$ may be calculated based on the CORESETs symbols. NR supports two levels of UE processing capability, including UE capability 1 (basic UE processing capability) and UE capability 2 (advanced UE processing capability). UE capability 2 refers to a UE with higher performance, which can support a faster decoding, e.g. UE supporting Ultra-Reliable Low-Latency Communication (URLLC). For example, if one symbol contains 2 PDCCH repetitions, operations 902, operations 1002, and operations 1102 as described above can be implemented for determining the processing delay for the decoding of the PDCCH repetition based on the multiplexing pattern.

In one embodiment, the operations of determining the processing delay based on the multiplexing pattern may include the operation 902. In operation 902, the UE may determine a number of symbols associated with the two PDCCH repetitions that overlap with the PDSCH as one symbol.

In one embodiment, the operations of determining the processing delay based on the multiplexing pattern may include the operation 1002. In operation 1002, the UE may determine a number of symbols associated with the two PDCCH repetitions that overlap with the PDSCH as two symbols.

In one embodiment, in operation 1102, the UE may determine a number of symbols associated with the two PDCCH repetitions that overlap with the PDSCH based on a UE capability.

In some embodiments, the operations of determining the processing delay may be based on CORESET symbols when a number of symbols for the PDSCH is smaller than a number of symbols for the CORESET associated with a linked SS. The CORESET symbols may include one PDCCH repetition.

In one embodiment, the UE may select the PDCCH repetition that starts later in time compared to other PDCCH repetitions in a group of PDCCH repetitions.

In one embodiment, the UE may select the PDCCH repetition that starts earlier in time compared to other PDCCH repetitions in a group of PDCCH repetitions.

Figure 12:
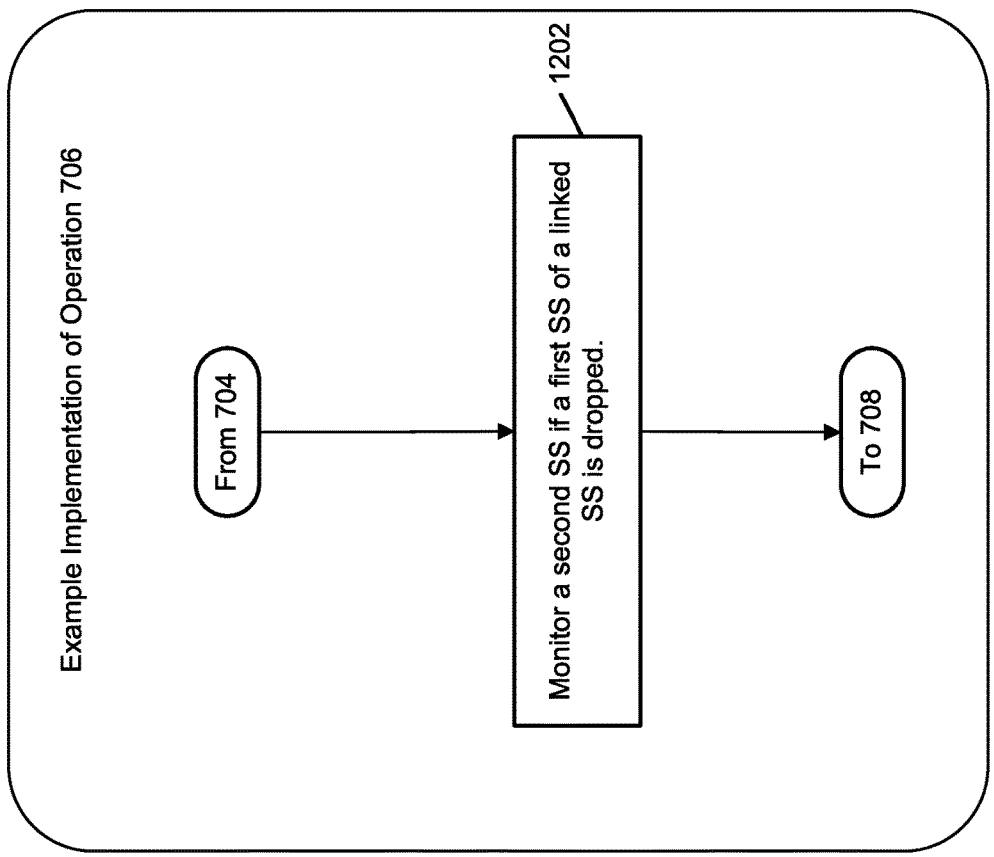

FIG. 12 illustrates an example of implementation of the operation 706 of determining a processing delay based on the multiplexing pattern of the PDCCH repetition and the PDSCH within the overlapping symbol described above.

In some embodiments, the operations of determining the processing delay based on the multiplexing pattern may include the following operation. In operation 1202, the UE may monitor a second SS if a first SS of a linked SS is dropped. Linked SS may include at least two SS. The PDCCH repetitions may be transmitted in a linked SS in which each PDCCH is transmitted in each SS. Linked SS may inform the UE the location of the PDCCH repetition.

If the first SS of the two linked SSs is dropped, the UE may report whether it would monitor the second SS by UE capability.

In one embodiment, the UE may be configured to monitor the second SS via radio resource control (RRC) signaling.

In addition, gNB may configure UE to monitor or drop the second SS by higher layer signaling, e.g. RRC.

Figure 13:
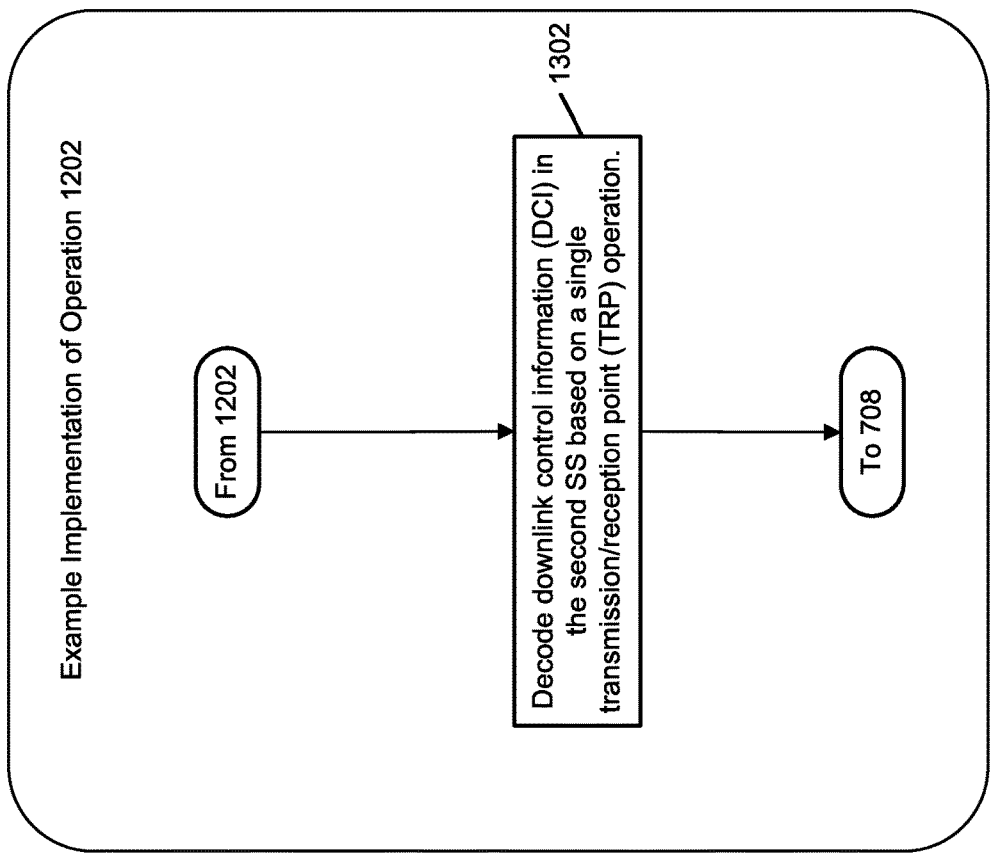
FIGS. 13-16 depict a flow diagram of a method by a UE for monitoring a second SS if a first SS of a linked SS is dropped according to one aspect of the disclosure.

FIG. 13 illustrates an example of the operation of monitoring a second SS if a first SS of a linked SS is dropped.

In one embodiment, the operations of monitoring the second SS if the first SS of the linked SS is dropped further include the following operation. In operation 1302, the UE may decode downlink control information (DCI) in the second SS based on a single transmission/reception point (TRP) operation.

The DCI decoded in the SS may be considered based on single-TRP operation, where the Rel-16 processing delay, e.g. Tproc1, Tproc2, timeDurationForQCL, beamSwitch-Timing, CSI processing delay Z and Z' and so on, can be applied. The DCI decoded in the SS may be considered based on single-TRP operation because the DCI may be found from a single SS.

Figure 14:
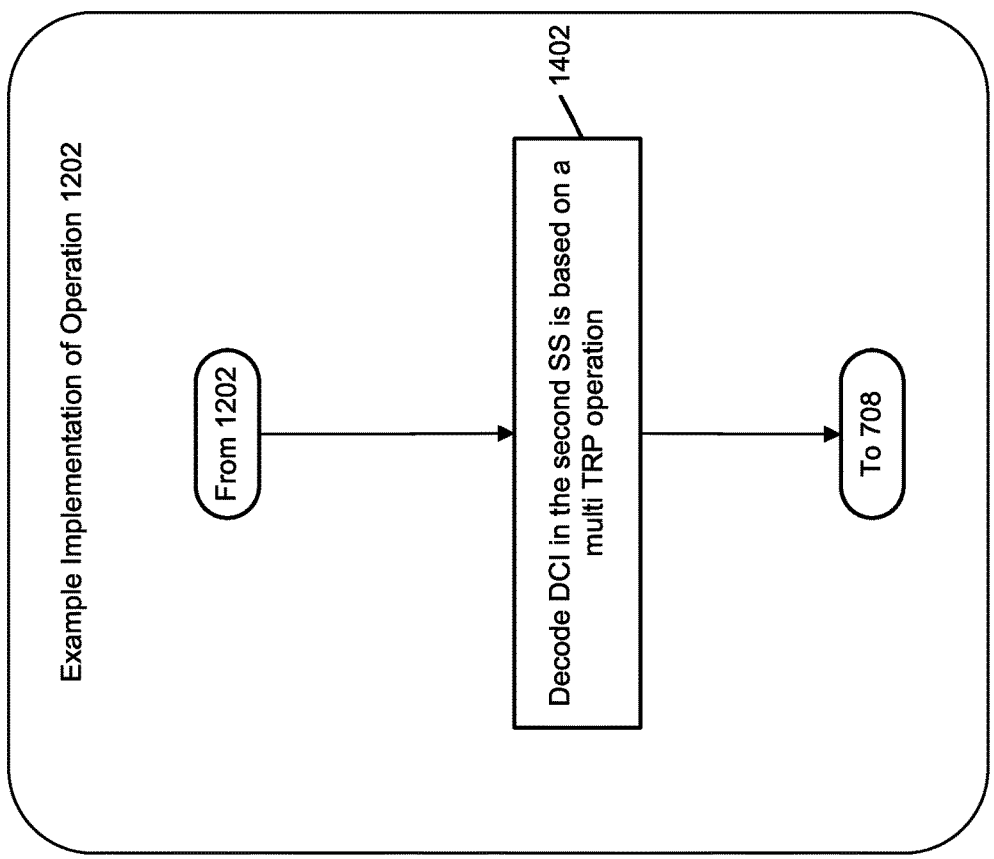

FIG. 14 illustrates an example of the operation of monitoring a second SS if a first SS of a linked SS is dropped.

In one embodiment, the operations of monitoring the second SS if the first SS of the linked SS is dropped may further include the following operation. In operation 1402, the UE may decode DCI in the second SS based on a multi-TRP operation.

If a single TRP operation is considered, the UE may have a smaller latency compared to when the multi-TRP is used. Multi-TRP operation may provide a low processing complexity with a high latency.

The DCI decoded in the SS is considered based on multi-TRP operation, where the proposed processing delay, e.g. Tproc1, Tproc2, timeDurationForQCL, beamSwitch-Timing, CSI processing delay Z and Z' and so on, can be applied.

Figure 15:
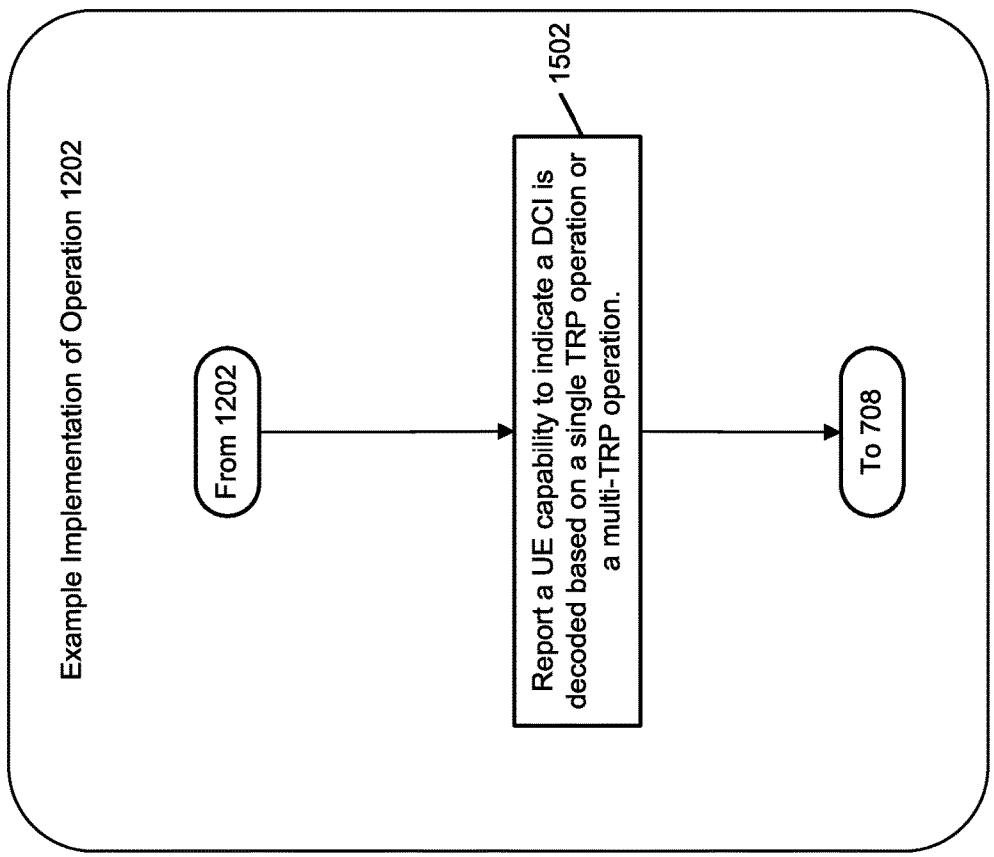

FIG. 15 illustrates an example of the operation of monitoring a second SS if a first SS of a linked SS is dropped.

In one embodiment, the operations of monitoring the second SS if the first SS of the linked SS is dropped may further include the following operation. In operation 1502, the UE may report a UE capability to indicate whether a DCI is decoded based on a single TRP operation or a multi-TRP operation.

In one embodiment, higher layer signaling, e.g. RRC or MAC CE can be used to indicate whether a DCI is decoded based on a single TRP operation or a multi-TRP operation.

In another embodiment, a second DCI can be used to indicate whether a DCI is decoded based on a single TRP operation or a multi-TRP operation. In this embodiment, one independent field can be introduced to indicate whether the DCI can be considered as single-TRP or multi-TRP operation. Alternatively, a reserved field of legacy field, e.g. antenna ports, can be used to indicate whether the DCI can be considered as single-TRP or multi-TRP operation.

Figure 16:
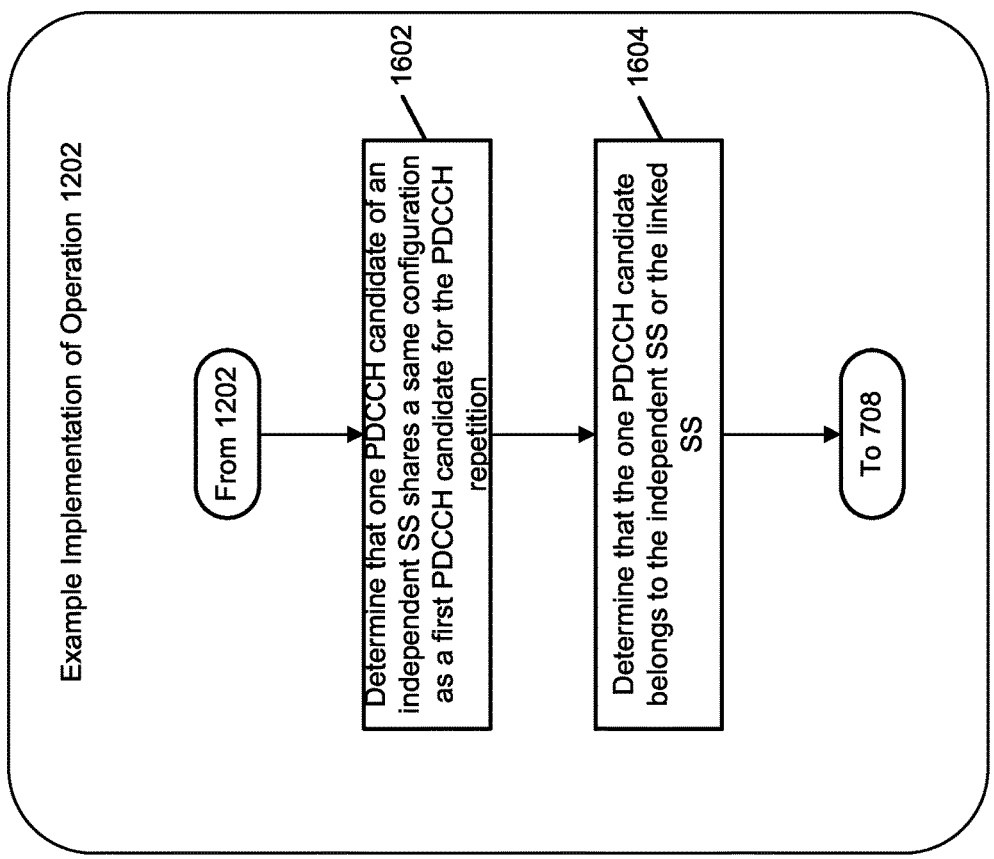

FIG. 16 illustrates an example of the operation of monitoring a second SS if a first SS of a linked SS is dropped.

In one embodiment, the operations of monitoring the second SS if the first SS of the linked SS is dropped may further include the following operation. In operation 1602, the UE may determine that one PDCCH candidate of an independent SS shares a same configuration as a first PDCCH candidate for the PDCCH repetition. In operation 1604, the UE may determine that the one PDCCH candidate belongs to the independent SS or the linked SS.

If one PDCCH candidate from an independent SS shares the same configuration as the first PDCCH candidate for PDCCH repetitions, the UE may report whether it would assume the PDCCH candidate is from the independent SS or linked SS.

Figure 17:
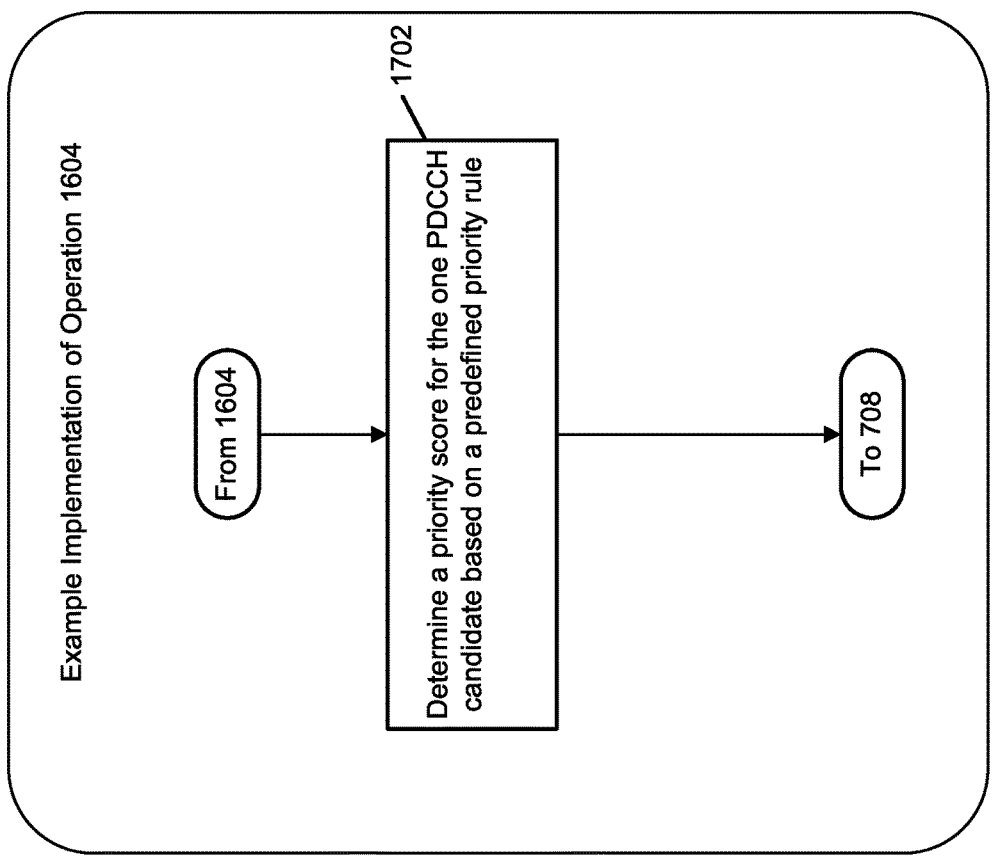
FIG. 17 depicts a flow diagram of a method by a UE for determining that the one PDCCH candidate belongs to the independent SS or the linked SS according to one aspect of the disclosure.

FIG. 17 illustrates an example of the operation of determining that the one PDCCH candidate belongs to the independent SS or the linked SS.

In one embodiment, the operations of determining that the one PDCCH candidate belongs to the independent SS or the linked SS may further include the following operation. In operation 1702, the UE may determine a priority score for the one PDCCH candidate based on a predefined priority rule.

Alternatively, a priority rule may be used to determine whether to prioritize the PDCCH from the independent SS or the PDCCH from the linked SSs. The priority rule may consider the factors including type of SS (common SS>UE specific SS), periodicity of SS, SS ID and CORESET ID. For example, a smaller periodicity may have a higher priority than a larger periodicity. Further, a smaller ID may have a higher priority than larger ID.

Figure 18:
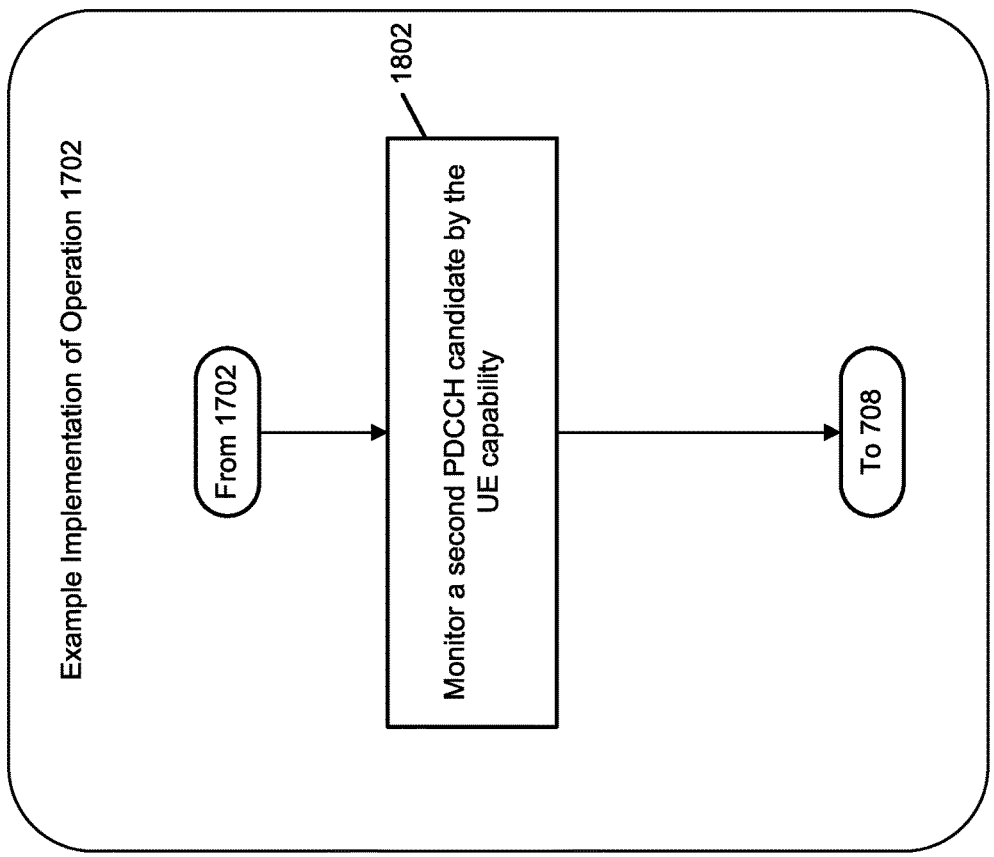
FIG. 18 depicts a flow diagram of a method by a UE for determining a priority score for the one PDCCH candidate based on a predefined priority rule according to one aspect of the disclosure.

FIG. 18 illustrates an example of the operation of determining a priority score for the one PDCCH candidate based on a predefined priority rule.

In one embodiment, the priority score for the one PDCCH candidate may indicate that the one PDCCH candidate belonging to the independent SS is prioritized. The operation may further include operation 1802 in which the UE may monitor a second PDCCH candidate by the UE capability.

FIG. 19 illustrates an example of implementation of the operation 706 of determining a processing delay based on the multiplexing pattern of the PDCCH repetition and the PDSCH within the overlapping symbol described above.

In one embodiment, the operations of determining a processing delay based on the multiplexing pattern further include the following operation. In operation 1902, the UE may determine an additional delay associated with processing PDCCH repetition. The additional delay may be reported by UE capability.

Alternatively, gNB can configure in determining whether to prioritize the PDCCH from the independent SS or the PDCCH from the linked SSs. If UE prioritizes the independent SS, for the second PDCCH candidate, UE may report whether it would monitor the second PDCCH candidate by UE capability. Alternatively, a base station (e.g., gNB) may configure whether to monitor the second PDCCH candidate by higher layer signaling, e.g. RRC. The decoding latency for the independent SS and the second SS can be determined by the above described operations when the UE monitors the second SS.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMS, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A baseband processor of a user equipment (UE) configured to perform operations comprising:
monitoring a transmission of a physical downlink control channel (PDCCH) repetition;
determining a multiplexing pattern of the PDCCH repetition and a physical downlink shared channel (PDSCH) within an overlapping symbol;
determining a processing delay for a decoding of the PDCCH repetition, a decoding of a scheduled PDSCH, and an acknowledgement (ACK) preparation based on the multiplexing pattern of the PDCCH repetition and the PDSCH within the overlapping symbol, the determining of the processing delay comprising:
selecting the PDCCH repetition that starts later in time compared to other PDCCH repetitions in a group of PDCCH repetitions; and
determining a number of symbols associated with the one PDCCH repetition that overlaps with the PDSCH; and
monitoring the PDSCH after receiving the PDCCH repetition.

2. The baseband processor of claim 1, wherein the multiplexing pattern of the PDCCH repetition and the PDSCH within the overlapping symbol includes one PDCCH repetition and the PDSCH.

3. The baseband processor of claim 2, wherein the operations of determining the processing delay based on the multiplexing pattern further comprise:

selecting the PDCCH repetition that starts earlier in time compared to other PDCCH repetitions in a group of PDCCH repetitions; and
determining a number of symbols associated with the one PDCCH repetition that overlaps with the PDSCH.

4. The baseband processor of claim 2, wherein the operations of determining the processing delay based on the multiplexing pattern further comprise:
selecting the PDCCH repetition that ends later in time compared to other PDCCH repetitions in a group of PDCCH repetitions; and
determining a number of symbols associated with the one PDCCH repetition that overlaps with the PDSCH.

5. The baseband processor of claim 2, wherein the operations of determining the processing delay based on the multiplexing pattern further comprise:
selecting the PDCCH repetition that ends earlier in time compared to other PDCCH repetitions in a group of PDCCH repetitions; and
determining a number of symbols associated with the one PDCCH repetition that overlaps with the PDSCH.

6. The baseband processor of claim 1, wherein the multiplexing pattern of the PDCCH repetition and the PDSCH within the overlapping symbol includes two PDCCH repetitions and the PDSCH.

7. The baseband processor of claim 6, wherein the operations of determining the processing delay based on the multiplexing pattern further comprise:
determining a number of symbols associated with the two PDCCH repetitions that overlap with the PDSCH as one symbol.

8. The baseband processor of claim 6, wherein the operations of determining the processing delay based on the multiplexing pattern further comprise:
determining a number of symbols associated with the two PDCCH repetitions that overlap with the PDSCH as two symbols.

9. A baseband processor of a user equipment (UE) configured to perform operations comprising:
monitoring a transmission of a physical downlink control channel (PDCCH) repetition;
determining a multiplexing pattern of the PDCCH repetition and a physical downlink shared channel (PDSCH) within an overlapping symbol;
determining a processing delay for a decoding of the PDCCH repetition, a decoding of a scheduled PDSCH, and an acknowledgement (ACK) preparation based on the multiplexing pattern of the PDCCH repetition and the PDSCH within the overlapping symbol, wherein determining the processing delay is based on control resource set (CORESET) symbols when a number of symbols for the PDSCH is smaller than a number of symbols for the CORESET associated with a linked search space (SS), and the CORESET symbols include two PDCCH repetitions; and
monitoring the PDSCH after receiving the PDCCH repetition.

10. The baseband processor of claim 9, wherein the operations of determining the processing delay based on the multiplexing pattern further comprise:
determining a number of symbols associated with the two PDCCH repetitions as one symbol.

11. The baseband processor of claim 9, wherein the operations of determining the processing delay based on the multiplexing pattern further comprise:
determining a number of symbols associated with the two PDCCH repetitions as two symbols.

12. A baseband processor of a user equipment (UE) configured to perform operations comprising:
monitoring a transmission of a physical downlink control channel (PDCCH) repetition;
determining a multiplexing pattern of the PDCCH repetition and a physical downlink shared channel (PDSCH) within an overlapping symbol;
determining a processing delay for a decoding of the PDCCH repetition, a decoding of a scheduled PDSCH, and an acknowledgement (ACK) preparation based on the multiplexing pattern of the PDCCH repetition and the PDSCH within the overlapping symbol, wherein determining the processing delay is based on CORESET symbols when a number of symbols for the PDSCH is smaller than a number of symbols for the CORESET associated with a linked SS, and wherein the CORESET symbols include one PDCCH repetition; and
monitoring the PDSCH after receiving the PDCCH repetition.

13. The baseband processor of claim 1, wherein the operations of determining the processing delay based on the multiplexing pattern further comprise:
monitoring a second SS if a first SS of a linked SS is dropped.

14. The baseband processor of claim 13, wherein the UE is configured to monitor the second SS via radio resource control (RRC) signaling.

15. The baseband processor of claim 13, wherein the operations of monitoring the second SS if the first SS of the linked SS is dropped further comprise:
decoding downlink control information (DCI) in the second SS is based on a single transmission/reception point (TRP) operation.

16. The baseband processor of claim 13, wherein the operations of monitoring the second SS if the first SS of the linked SS is dropped further comprise:
decoding DCI in the second SS is based on a multi-TRP operation.

17. The baseband processor of claim 13, wherein the operations of monitoring the second SS if the first SS of the linked SS is dropped further comprise:
reporting a UE capability to indicate a DCI is decoded based on a single TRP operation or a multi-TRP operation.

18. The baseband processor of claim 17, wherein the operations of monitoring the second SS if the first SS of the linked SS is dropped further comprise:
determining that one PDCCH candidate of an independent SS shares a same configuration as a first PDCCH candidate for the PDCCH repetition; and
determining that the one PDCCH candidate belongs to the independent SS or the linked SS.

19. A baseband processor of a user equipment (UE) configured to perform operations comprising:
monitoring a transmission of a physical downlink control channel (PDCCH) repetition;
determining a multiplexing pattern of the PDCCH repetition and a physical downlink shared channel (PDSCH) within an overlapping symbol;
determining a processing delay for a decoding of the PDCCH repetition, a decoding of a scheduled PDSCH, and an acknowledgement (ACK) preparation based on the multiplexing pattern of the PDCCH repetition and the PDSCH within the overlapping symbol, wherein determining the processing delay comprises determining an additional delay associated with processing PDCCH repetition, wherein the additional delay is reported by a UE capability; and monitoring the PDSCH after receiving the PDCCH repetition.

20. A user equipment (UE) device comprising:
at least one antenna; at least one radio, wherein the at least one radio is configured to communicate with a second UE device of a communication network using the at least one antenna; and
at least one processor coupled to the at least one radio, wherein the at least one processor is configured to perform operations comprising:
  monitoring a transmission of a physical downlink control channel (PDCCH) repetition;
  determining a multiplexing pattern of the PDCCH repetition and a physical downlink shared channel (PDSCH) within an overlapping symbol;
determining a processing delay for a decoding of the PDCCH repetition, a decoding of a scheduled PDSCH, and an acknowledgement (ACK) preparation based on the multiplexing pattern of the PDCCH repetition and the PDSCH within the overlapping symbol, the determining of the processing delay comprising:
  selecting the PDCCH repetition that starts later in time compared to other PDCCH repetitions in a group of PDCCH repetitions; and
  determining a number of symbols associated with the one PDCCH repetition that overlaps with the PDSCH; and
monitoring the PDSCH after receiving the PDCCH repetition.

* * * * *